July 5, 1966  W. JONES  3,258,893
INTERMITTENT MOTION CARTONING MACHINE
Filed April 11, 1963  17 Sheets-Sheet 1

INVENTOR.
Wickliffe Jones.
BY
Wood, Herron & Evans.
ATTORNEYS.

July 5, 1966 W. JONES 3,258,893
INTERMITTENT MOTION CARTONING MACHINE
Filed April 11, 1963 17 Sheets-Sheet 7

INVENTOR.
Wickliffe Jones.
BY
Wood, Herron & Evans
ATTORNEYS.

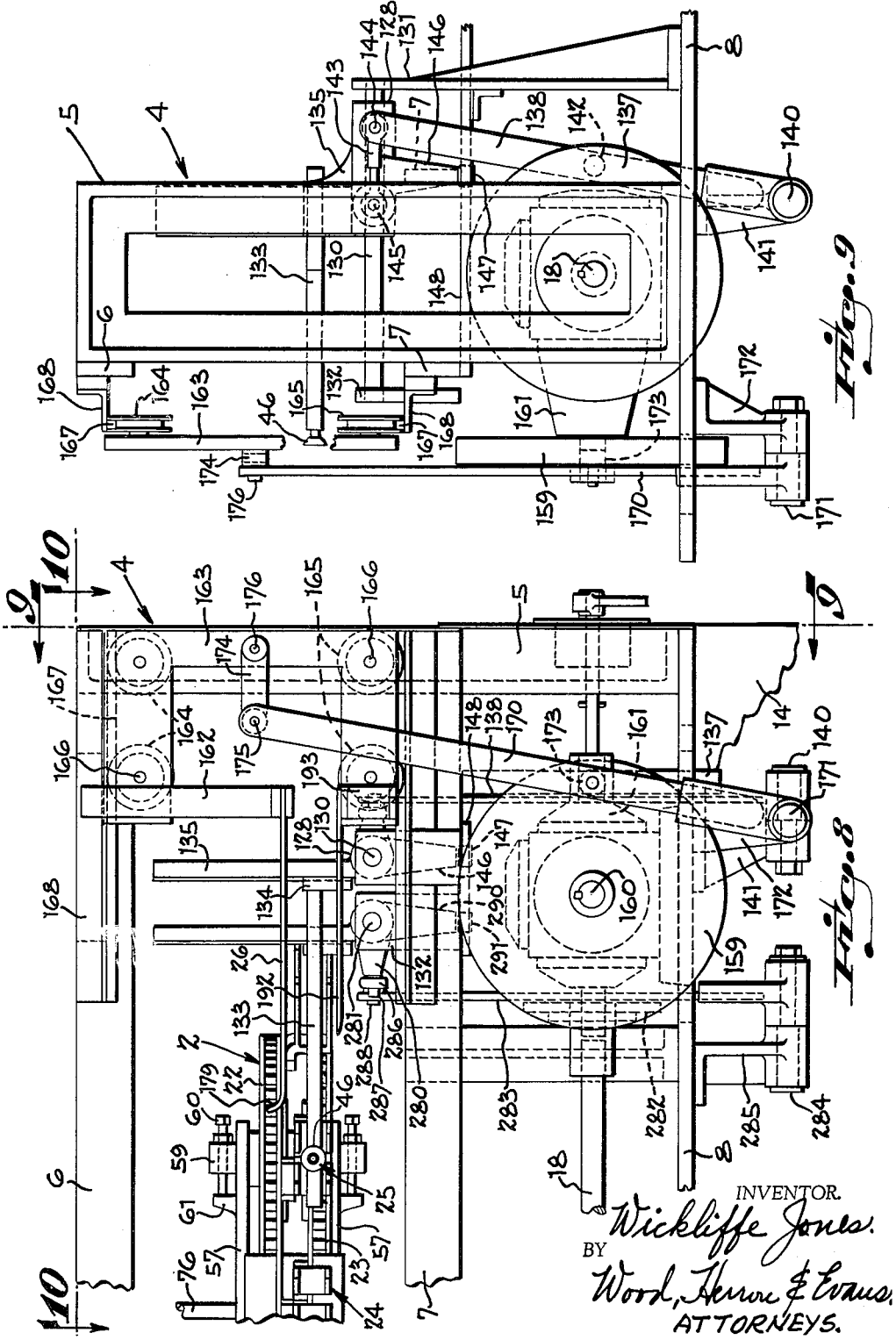

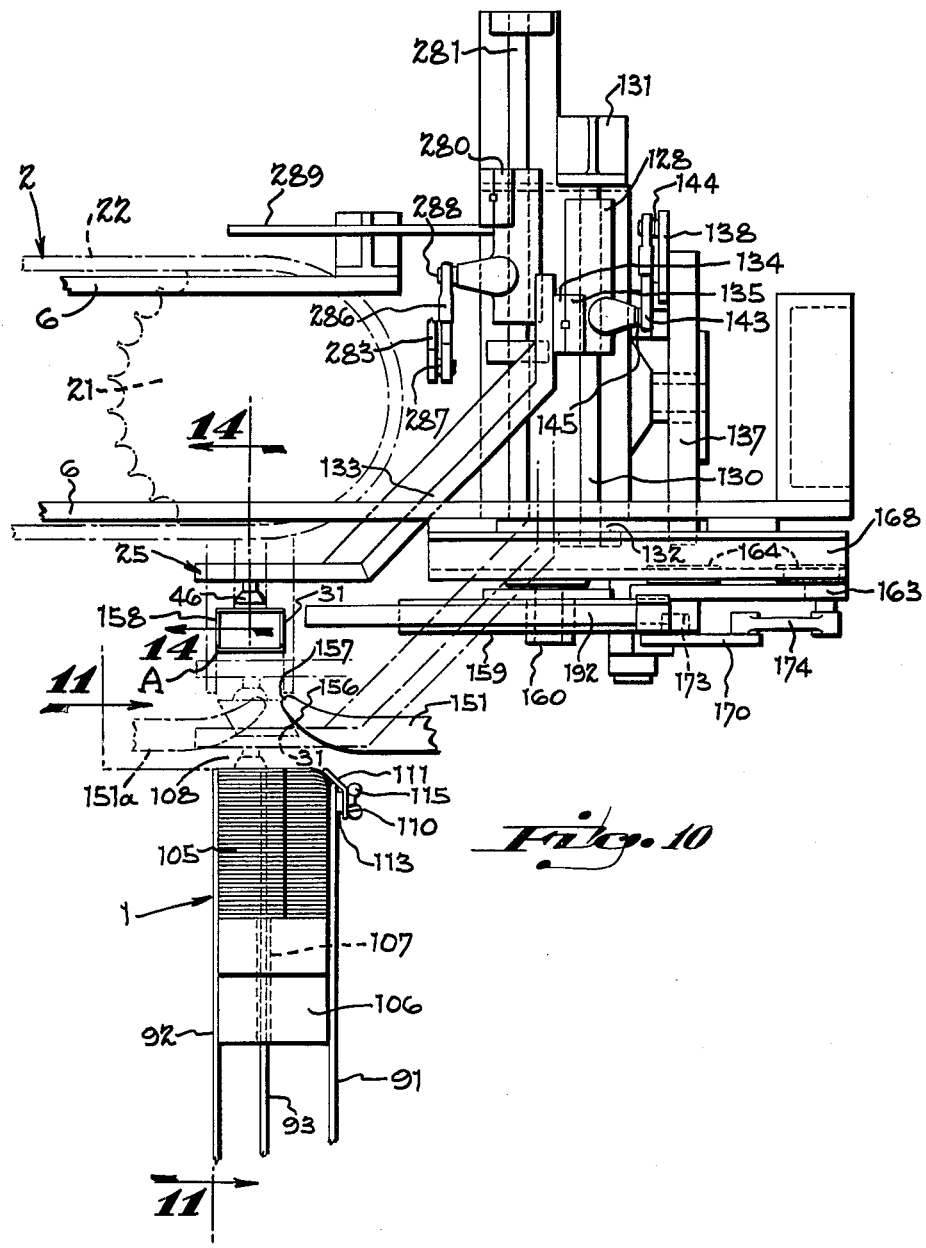

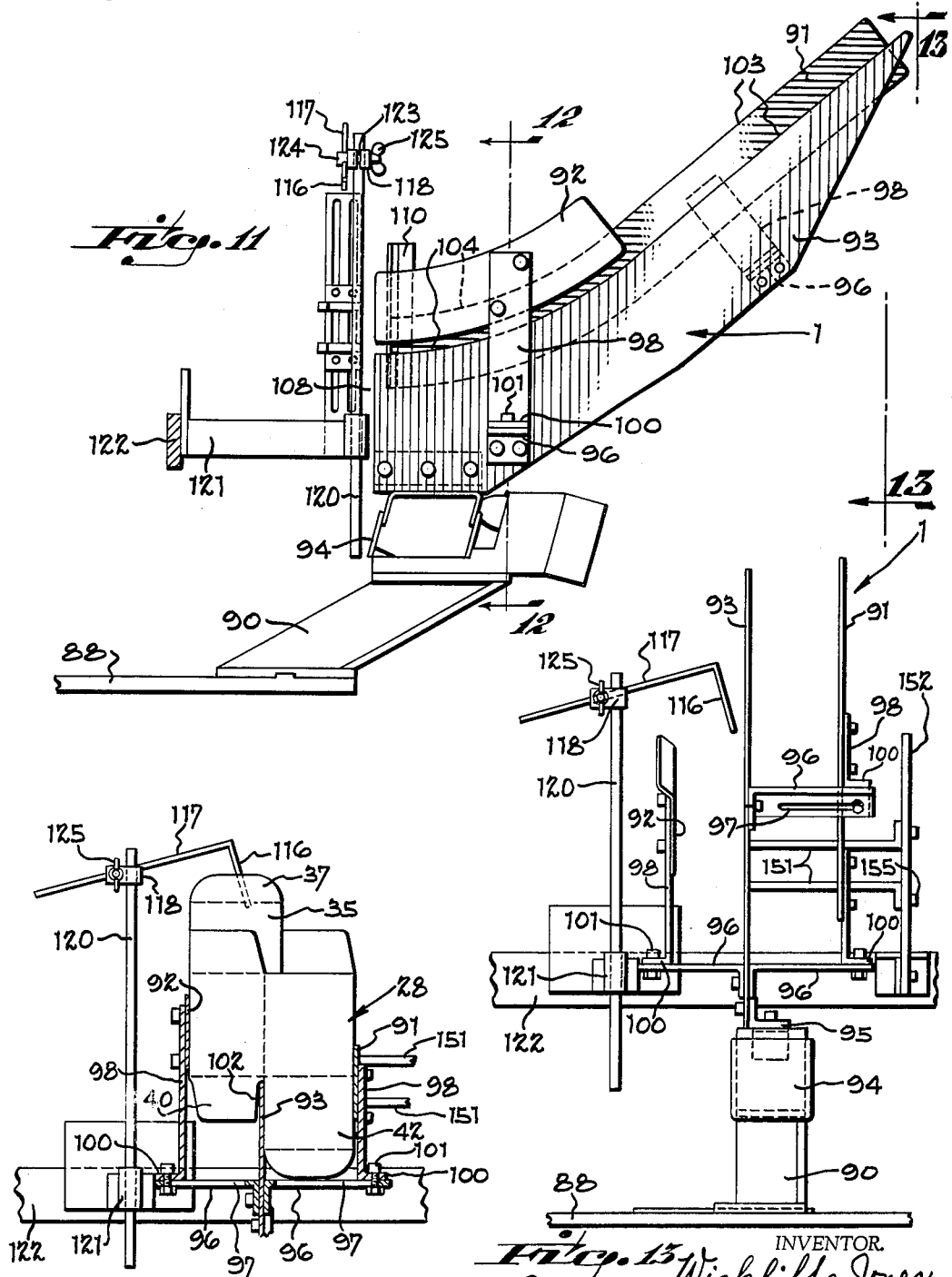

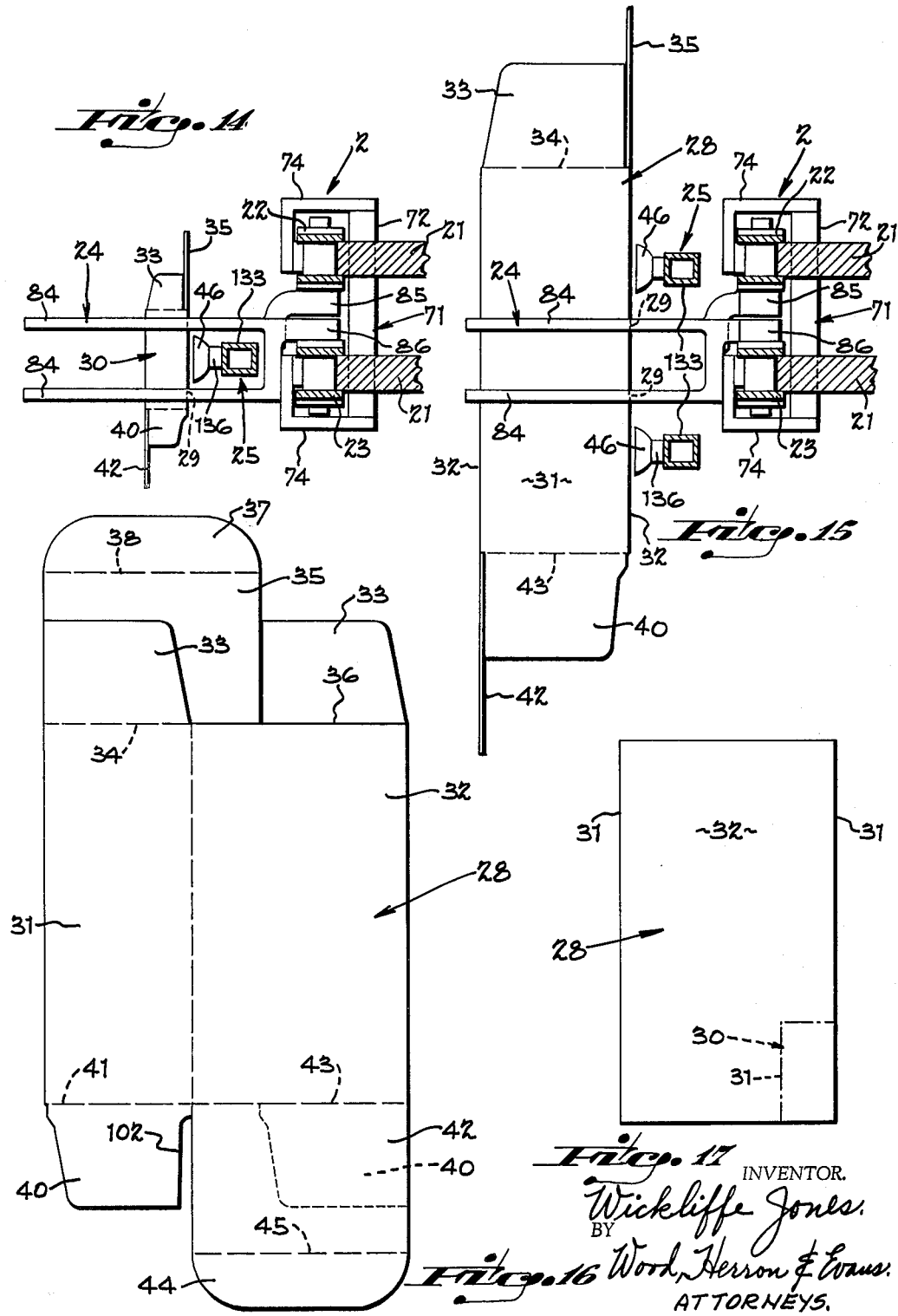

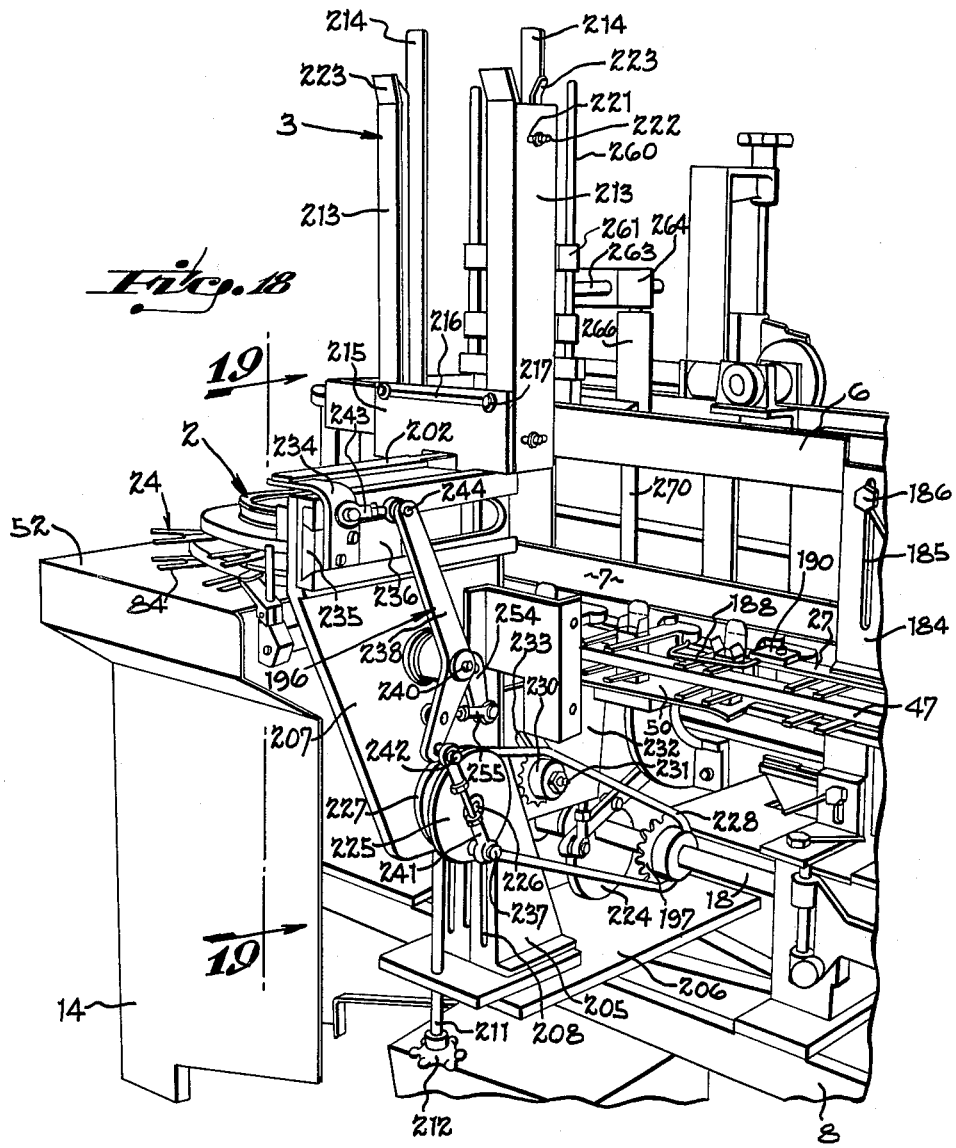

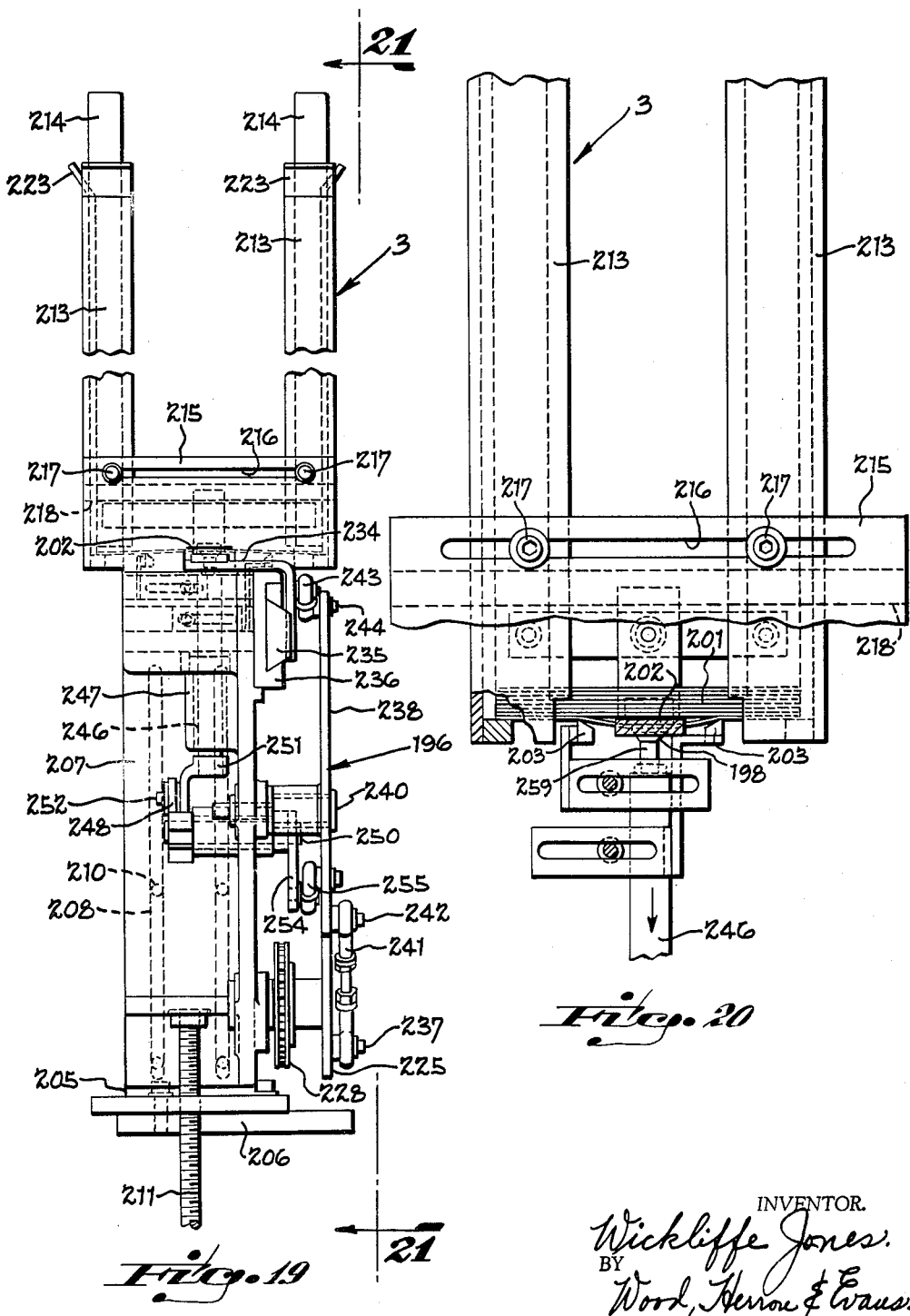

INVENTOR.
Wickliffe Jones
BY Wood, Herron & Evans
ATTORNEYS.

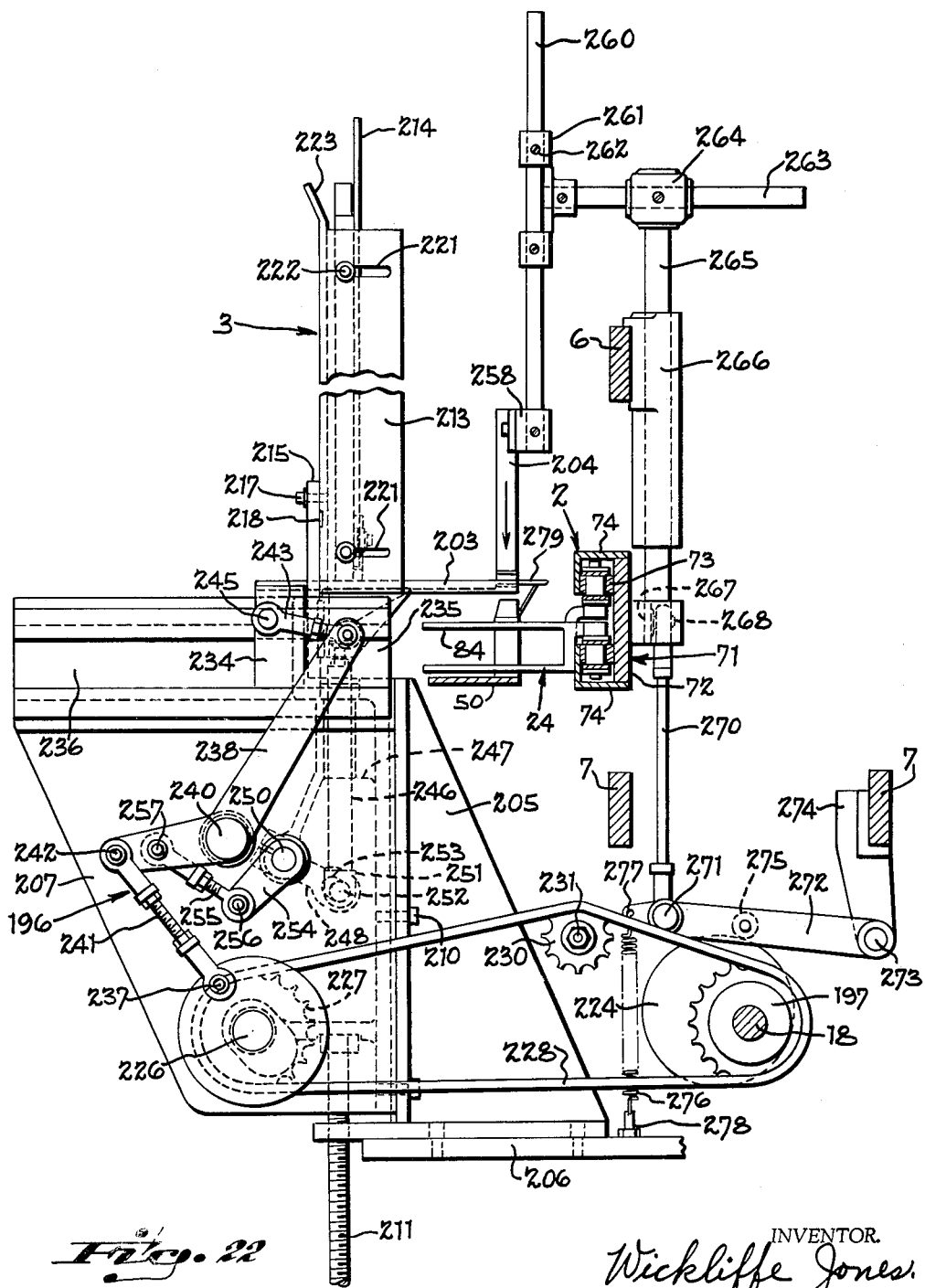

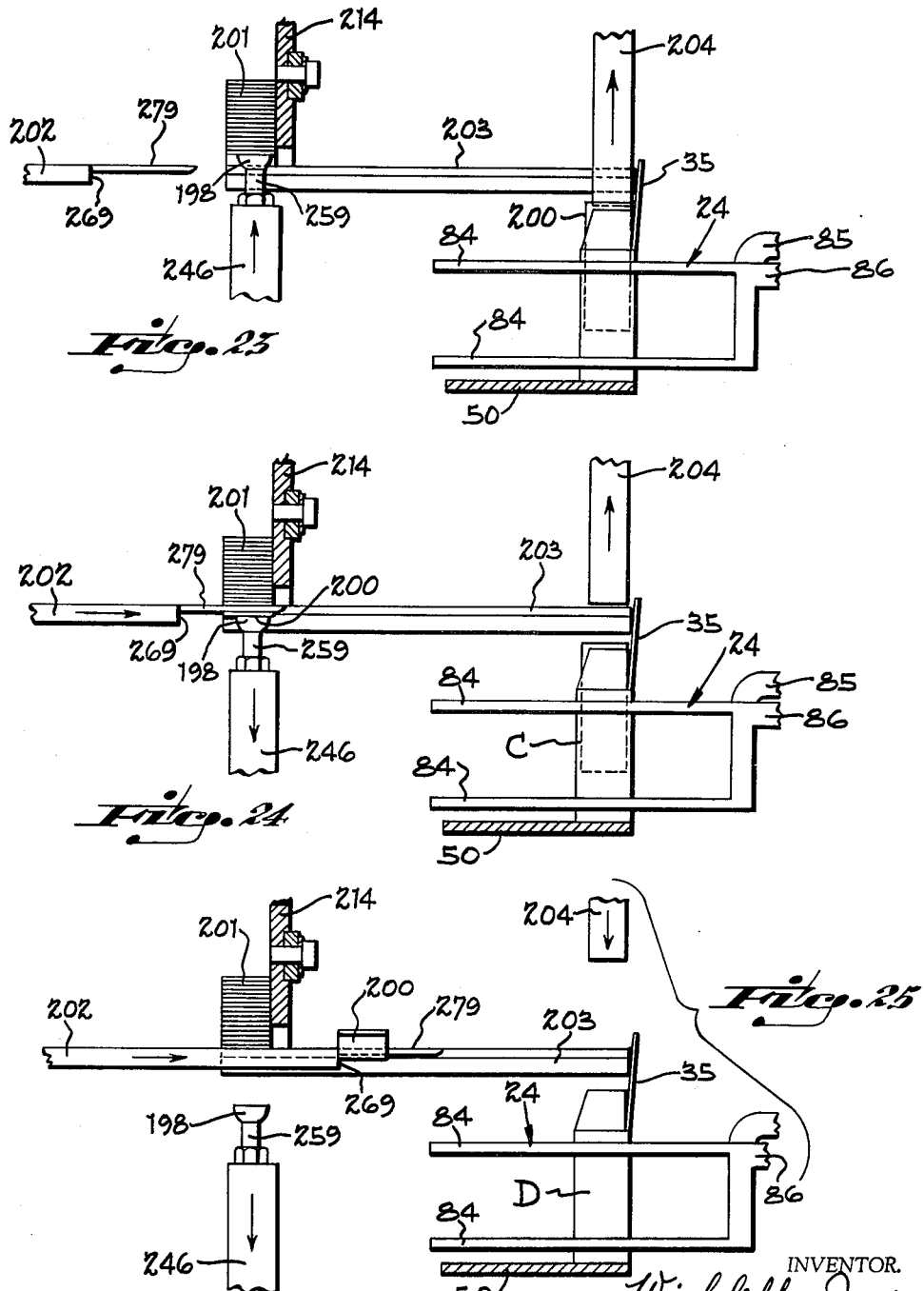

United States Patent Office 3,258,893
Patented July 5, 1966

3,258,893
INTERMITTENT MOTION CARTONING MACHINE
Wickliffe Jones, Cincinnati, Ohio, assignor to R. A. Jones and Company, Inc., Covington, Ky., a corporation of Kentucky
Filed Apr. 11, 1963, Ser. No. 272,254
21 Claims. (Cl. 53—186)

This invention relates to a cartoning machine in which collapsed cartons are erected and transported in stepwise fashion while in an upright position, such that the articles may be inserted in a convenient manner into the open upper ends of the cartons.

One of the primary objectives of the invention has been to provide a cartoning machine of simple construction in which the components of the machine may be set up to handle cartons in a wide range of sizes, such that a machine of generally standardized construction may be converted for use in packing articles produced by various industries.

Described generally, a cartoning machine constructed according to the principles of the present invention comprises a horizontal intermittent chain conveyor system, including carton transporting lugs forming pockets which may be regulated to embrace the various carton sizes within the range of the machine. The conveyor system is in the form of a loop providing a down-stream run along one side of the machine, and an upstream run extending along the opposite side from the downstream to the discharge end of the machine. The carton conveyor comprises a self-contained unit which may be shifted vertically in a convenient manner relative to a stationary slide plate which supports the lower ends of the cartons after they have been erected and transferred to the conveyor, thereby to adapt the conveyor to the length of the selected carton size.

A carton magazine is mounted along the downstream run of the conveyor and is arranged to confine the cartons in collapsed stack formation. A carton transfer mechanism withdraws the collapsed cartons individually from the magazine, erects each carton, then locates it in an upright position in the pocket of the conveyor which is delineated by companion sets of conveyor lugs. After the carton is erected and confined in its conveyor pocket, the conveyor advances in stepwise fashion along the downstream run toward a flap handling mechanism which folds the bottom flaps of the carton to a closed position, while a hold-down mechanism slidably engages the open upper end of the carton to counteract the upward forces developed by the bottom flap folding mechanism.

If required by the user, the machine may be equipped to feed a prefolded leaflet from a magazine, form it to a U-shape and insert it into the open upper end of the carton as it advances beyond the downstream end of the flap handling mechanism. As the cartons pass beyond the leaflet inserting mechanism and about the downstream end of the machine, an article, such as a bottle or the like is inserted into the upper end of the carton to engage the folded and partially inserted leaflet, thereby to push the leaflet downwardly into the carton against the previously closed bottom flaps.

After the article is inserted, the carton advances about the downstream end and along the upstream run of the conveyor. During the upstream carton motion, its upper flaps are folded and closed by a top flap handling mechanism located along the upstream conveyor run. Thereafter, the filled carton advances to a discharge station at the upstream end of the conveyor where it is discharged laterally from the machine.

Another objective of the invention has been to provide a simple carton magazine and feed mechanism, whereby the collapsed cartons are fed by gravity through the magazine and presented in a vertical position at the pick-up end of the magazine, to be erected and transferred directly into the pockets of the intermittent conveyor in a rapid, direct manner.

According to this aspect of the invention, the carton magazine includes a carton storage section which is inclined downwardly at an angle toward the carton conveyor. The lower portion of the magazine may be of curved formation leading to the pick-off station, where the cartons are presented to the carton transfer mechanism in an upright position. However, if desired, the curved portion may be omitted, such that the entire magazine is downwardly inclined, the magazine being arranged to present the cartons in vertical position at the pick-off station. A sliding weight is placed upon the upper end of the stacked cartons in the magazine, such that the weight is slidably confined in the downwardly inclined portion to urge the stacked cartons by gravity toward the pick-off end of the magazine.

Another objective has been to provide an improved mechanism for transferring and erecting the cartons in a rapid, reliable manner. According to this aspect of the invention, the carton transfer mechanism includes one or more suction mouthpieces which reciprocate in a horizontal plane between the pick-off station and the pockets of the carton conveyor system during a conveyor dwell period. In order to provide clearance for the suction mouthpiece at the limit of motion toward the conveyor, the lugs of the conveyor are relatively long and include shoulders which engage the inner main wall of the carton. As the wall of the carton is engaged by the shoulders, the mouthpiece releases the carton and an upper and lower flap folder, which reciprocate in unison, engage the opposite ends of the carton to hold it in position in the pocket. Thereafter, the upper and lower ends of the cartons are confined between stationary slide bars which engage the upper and lower ends and also the outer main wall of the carton.

In order to adapt the machine to the handling of various carton sizes, the carton magazine includes shiftable carton guide elements which may be positioned in accordance with the length and width of the carton blanks. The carton feed and transfer mechanism also includes elements which may be shifted in setting up the machine to accommodate the desired carton size. In addition, the magazine and carton transfer mechanism may be shifted vertically with respect to the slide plate, similar to the conveyor, to compensate for the length of the upright carton.

A further objective of the invention has been to construct the leaflet magazine and leaflet feed mechanism in the form of a self-contained unit which forms a demountable attachment adapted to feed, form and insert individual prefolded leaflets into the upper end of the cartons after the bottom flaps of the cartons have been closed.

In general, the leaflet feeding and inserting mechanism comprises a vertical leaflet magazine, and a leafflet transfer mechanism which withdraws and transfers the leaflets individually from the lower end of the magazine to a position above the open end of the carton. A pair of plungers reciprocate in a vertical path in time with the other components of the machine to form the leaflet to a generally U-shaped configuration and to insert it into the upper portion of the open carton during the conveyor dwell period.

The leaflet magazine and its handling mechanism, as a self-contained unit, may be mounted on the standard machine and interconnected with its driving system in a simple manner, if the carton handling operation requires the insertion of the leaflets. The self-contained leaflet unit may be shifted vertically relative to the carton-supporting slide plate in a convenient manner in accordance with the depth of the carton. In addition, the components of the magazine itself and its leaflet feeding and transfer mechanism also may be regulated in accordance with the size of the leaflets, which will vary in accordance with the carton size.

The top and bottom flap mechanism is also adjustable to accommodate the various carton sizes. By virtue of the several features of the present invention, a standardized machine may be set up to handle a wide range of carton sizes and types in an efficient manner, thereby avoiding much of the cost and effort of producing a special machine for each size or type of carton.

The various features and advantages of the invention will be more readily apparent to those skilled in the art from the following detailed description, taken in conjunction with the drawings.

Figure 5:
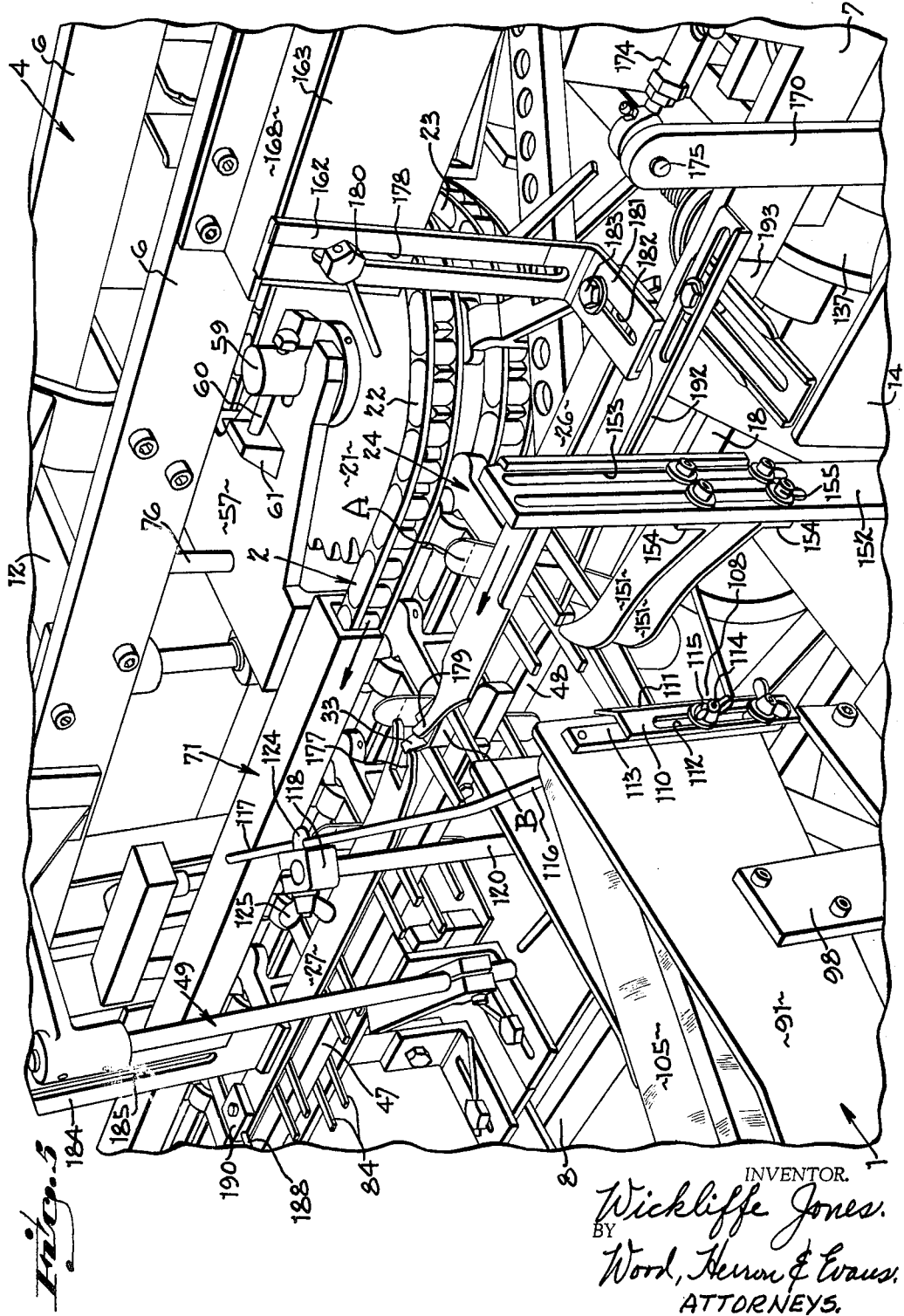
FIGURE 5 is a view similar to FIGURE 4, but showing the reciprocating flap folder advancing from the retracted position to further illustrate the operation of the flap folding mechanism.
Figure 6:
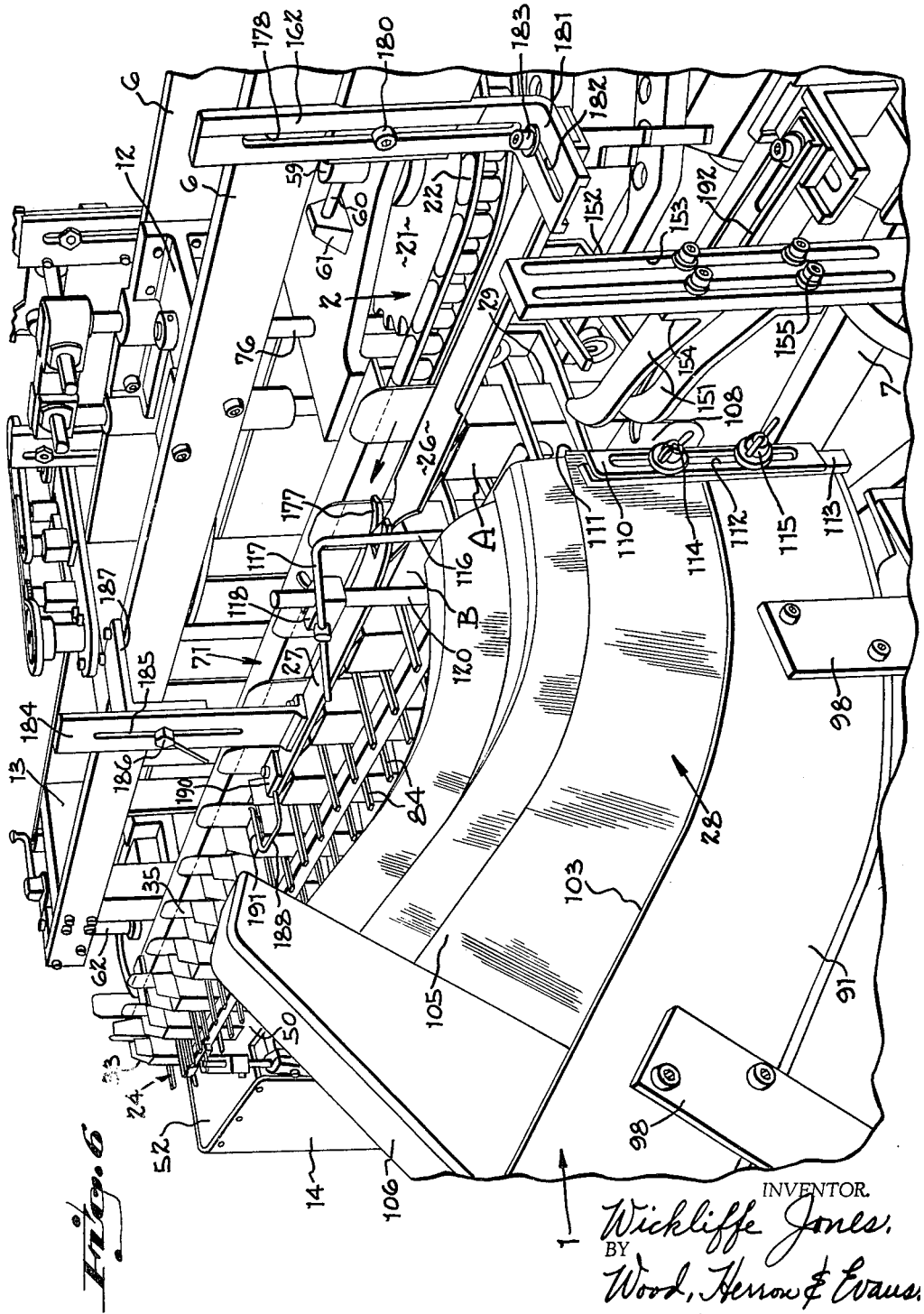

FIGURE 6 is a fragmentary perspective view, generally similar to FIGURE 5, showing the flap folder in its fully advanced position, with the parts set up to handle a larger size carton. After passing beyond the downstream end of the flap folder and hold-down bar, a leaflet is partially inserted into the open upper end of the carton by a leaflet inserting mechanism. However, this mechanism is in the form of an attachment and has been omitted from FIGURE 6 for clarity; the leaflet inserting mechanism is shown generally in FIGURE 18.

Figure 1:
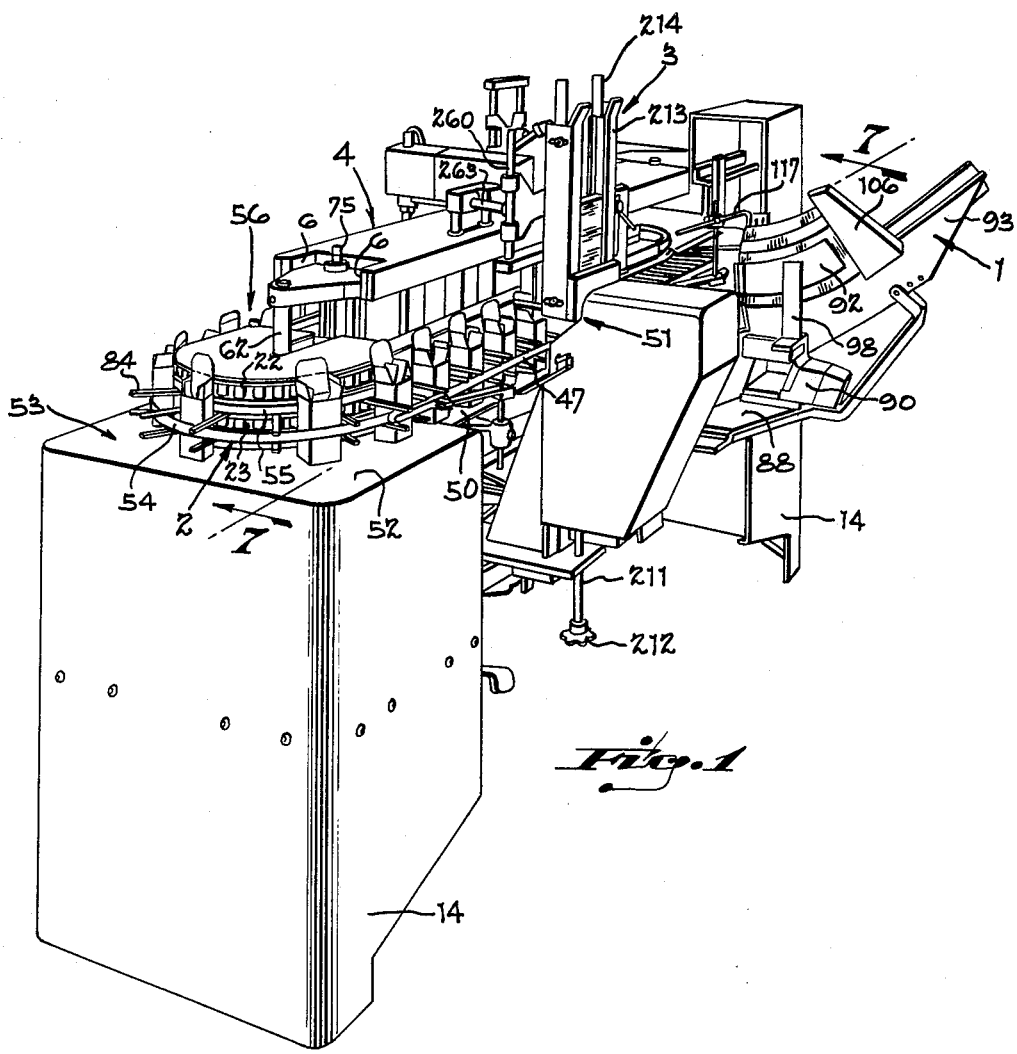
FIGURE 1 is a perspective of the cartoning machine as viewed from its downstream end, illustrating the general arrangement of components.
Figure 7:
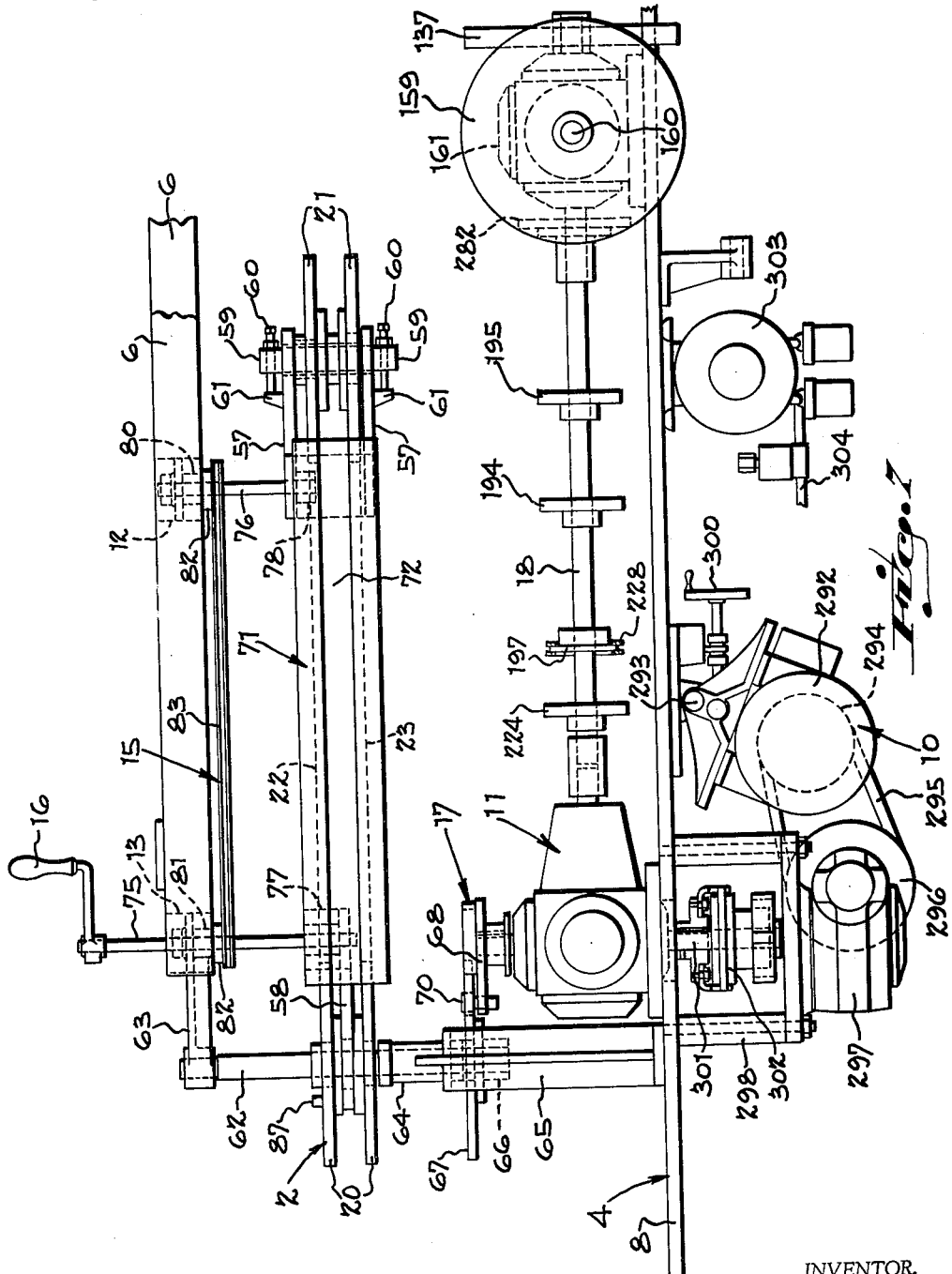

FIGURE 7 is a fragmentary view generally along the line 7—7 of FIGURE 1 showing the driving system which operates the carton conveyor and cam shaft of the machine.

Figure 2:
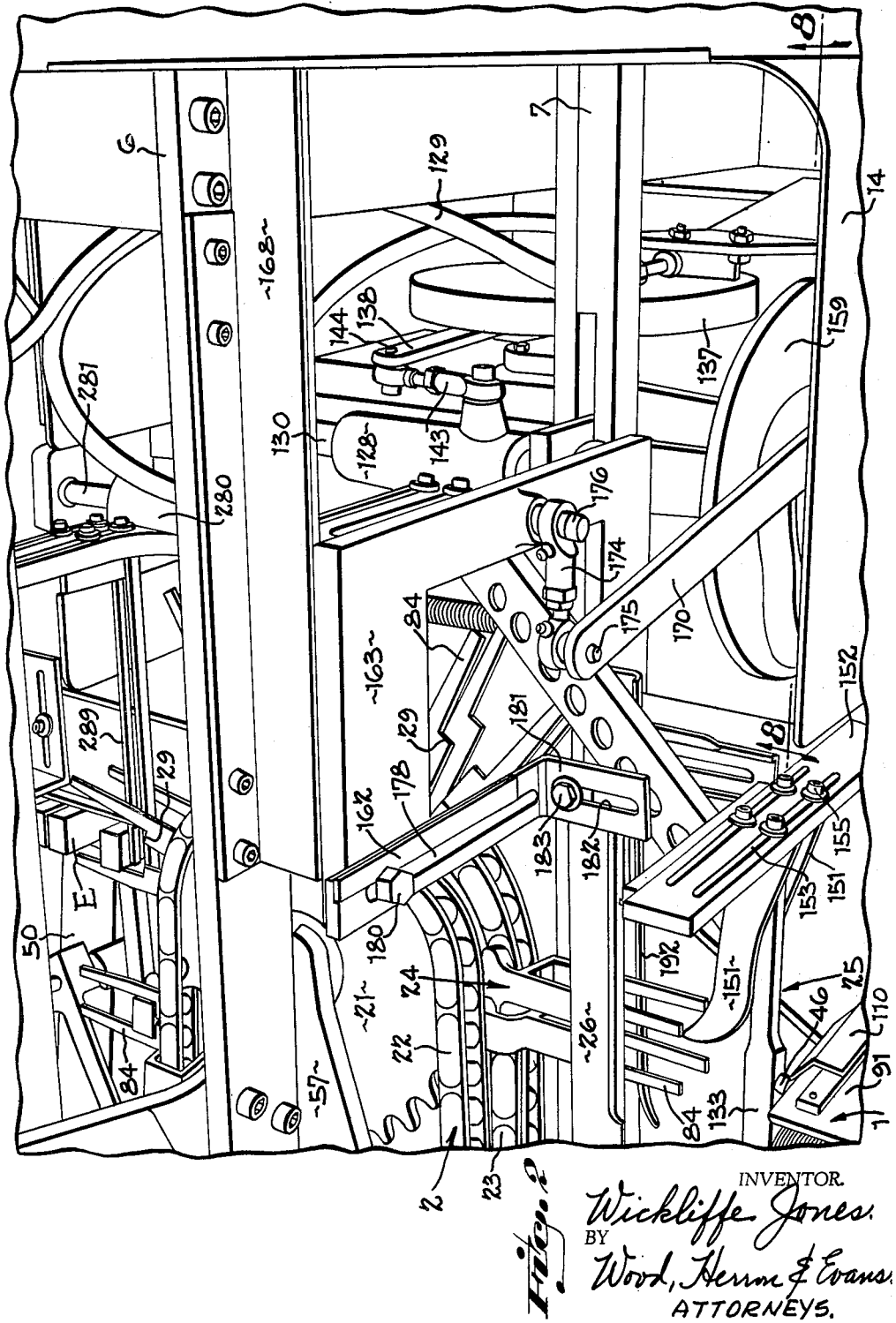
FIGURE 2 is an enlarged fragmentary perspective view of the upstream end of the machine, showing the general arrangement of the carton feeding mechanism in relation to the carton conveyor.

FIGURE 8 is a fragmentary sectional view taken along line 8—8 of FIGURE 2, similar to FIGURE 7 on a slightly larger scale, showing the cam and linkage mechanism which drives the reciprocating flap folder.

FIGURE 9 is an end view of the machine taken generally along the line 9—9 of FIGURE 8, illustrating the cam and linkage mechanism which reciprocates the suction cup of the carton feed mechanism.

FIGURE 10 is a fragmentary top plan view of the cam and linkage which operates the suction feed apparatus of the carton magazine and the carton discharge mechanism, as viewed along line 10—10 of FIGURE 8.

FIGURE 11 is an enlarged sectional view, taken generally along the line 11—11 of FIGURE 10, illustrating the carton magazine.

FIGURE 12 is a transverse section of the carton magazine, as viewed along the line 12—12 of FIGURE 11, showing the relationship of the collapsed cartons within the magazine.

FIGURE 13 is an end elevation of the carton magazine as viewed along line 13—13 of FIGURE 11, with the collapsed blanks removed to further illustrate the construction of the magazine.

FIGURE 14 is a fragmentary section taken along line 14—14 of FIGURE 10, detailing the position of the carton withdrawal suction cup when the machine is set up for handling cartons of minimum size.

FIGURE 15 is a section similar to FIGURE 14, showing the double suction cup arrangement which is utilized in handling the larger size cartons.

FIGURE 16 is a plan view of one of the maximum size cartons in collapsed condition, showing the arrangement of the flaps.

FIGURE 17 is a diagrammatic view showing the front panel of the maximum size carton in full lines and illustrating in broken lines the relative dimensions of the minimum size carton which the machine is adapted to handle.

FIGURE 18 is a fragmentary perspective view of the downstream end of the machine, particularly illustrating the leaflet feeding and folding mechanism installed as an attachment on the machine.

FIGURE 19 is an end elevation, as viewed generally along the line 19—19 of FIGURE 18, further illustrating the structural details of the leaflet magazine and feed mechanism, with the parts adjusted to a position for handling the maximum size leaflets.

FIGURE 20 is an enlarged fragmentary view taken from FIGURE 19, showing the leaflet magazine and feed mechanism adjusted to a position for accommodating smaller size leaflets.

Figure 21:
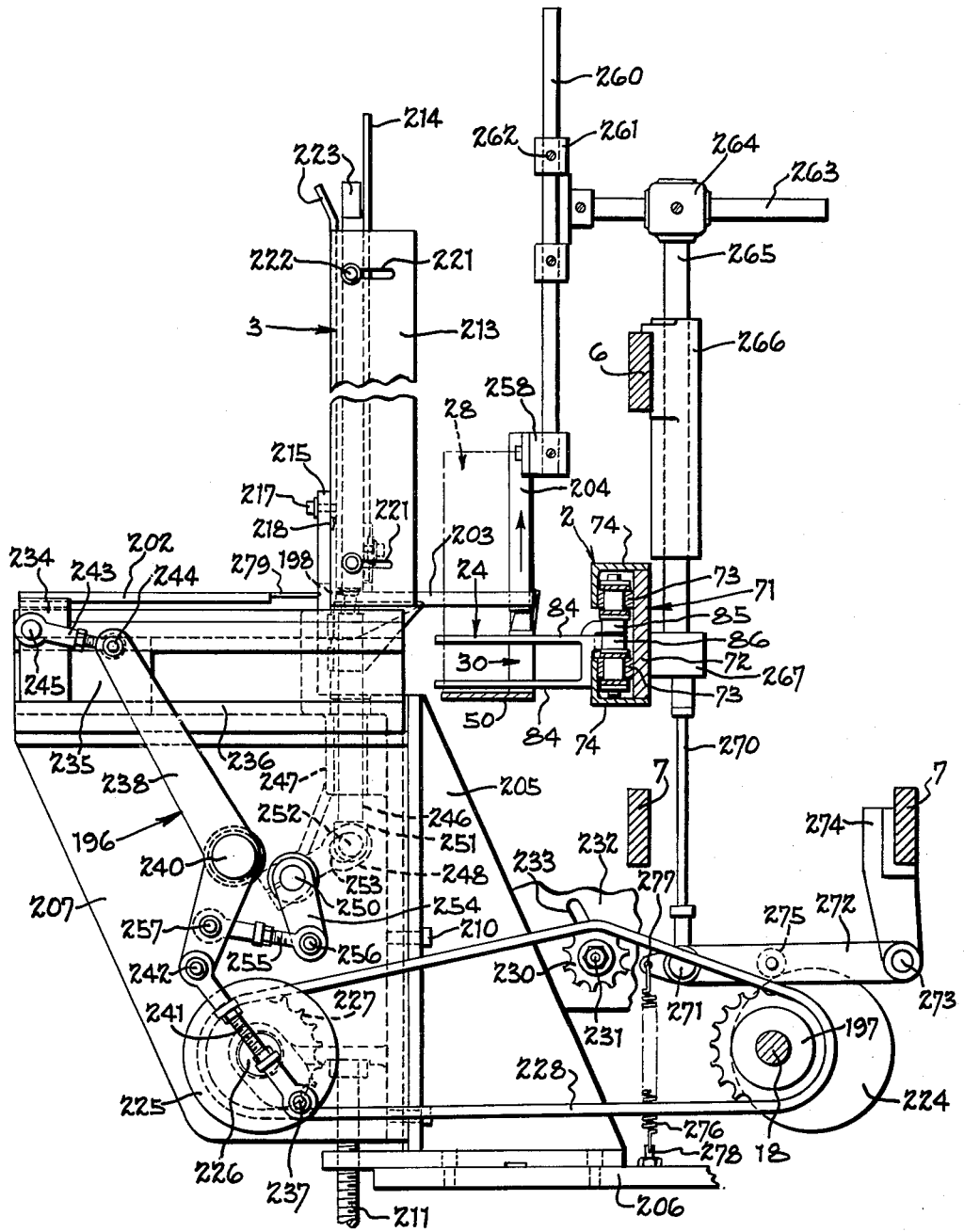

FIGURE 21 is a fragmentary section as viewed along the line 21—21 of FIGURE 19, further detailing the driving system of the leaflet feed mechanism which is shown generally in FIGURE 18.

FIGURE 22 is a view similar to FIGURE 21, showing the parts of the leaflet feeding mechanism in an advanced position, as distinguished from the retracted position shown in FIGURE 21.

FIGURE 23 is an enlarged diagrammatic view of the leaflet feeding mechanism taken from FIGURE 22. This view shows the suction cup in its elevated position with respect to the lower end of the leaflet magazine, with the horizontally reciprocating leaflet pusher in its retracted position and with the vertically reciprocating leaflet inserting plungers shifting upwardly after having partially inserted a leaflet into one of the cartons.

FIGURE 24 is a view similar to FIGURE 23, showing the downward motion of the suction cup in withdrawing a leaflet from the bottom of the magazine and showing the lateral motion of the leaflet pusher which shifts the leaflet laterally to a receiving position with respect to the upper end of a carton.

FIGURE 25 is a view similar to FIGURE 24, showing the position of the parts as the leaflet is transferred laterally toward the open end of the next successive carton, with the inserting plungers moving downwardly to intercept, fold and insert the leaflet into the carton.

Figure 26:
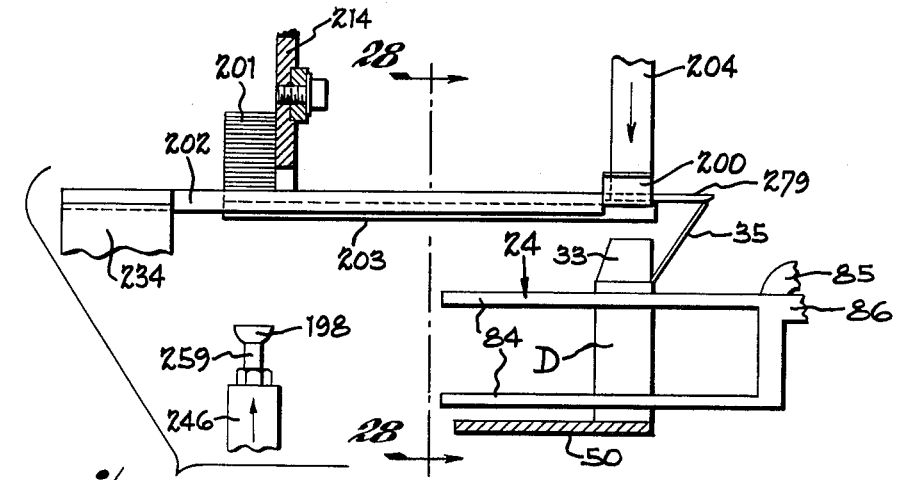

FIGURE 26 is a view similar to FIGURE 25, showing the inserting plungers engaging the leaflet after the leaflet pusher has shifted the leaflet to its position above the open end of the carton.

Figure 27:
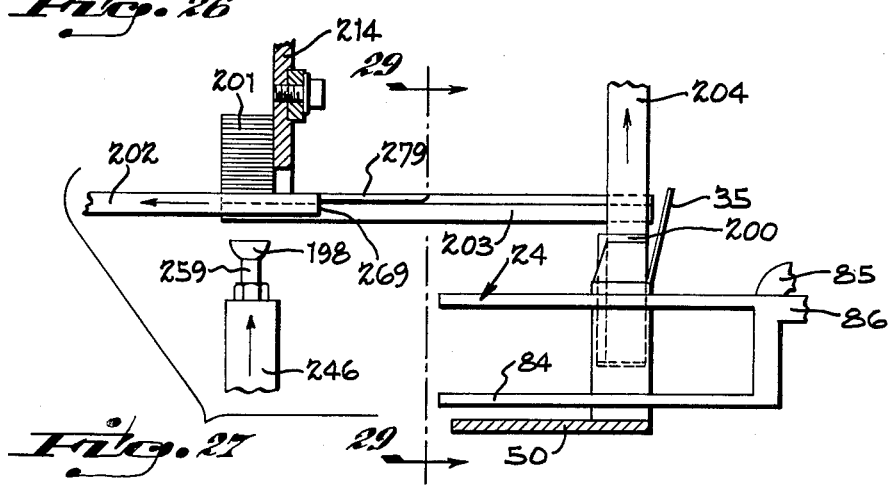

FIGURE 27 is a view similar to FIGURE 26, showing the completion of the leaflet inserting cycle.

Figure 28:
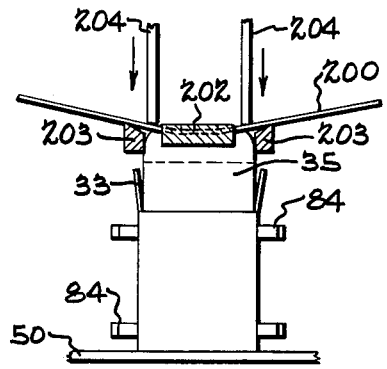

FIGURE 28 is a sectional view taken along line 28—28 of FIGURE 26, detailing the relationship of the lateral leaflet guide, the lateral leaflet pusher, and the vertical leaflet inserting plungers. In this view the vertical plungers are shown moving downwardly into engagement with the leaflet prior to forcing it into the carton.

Figure 29:
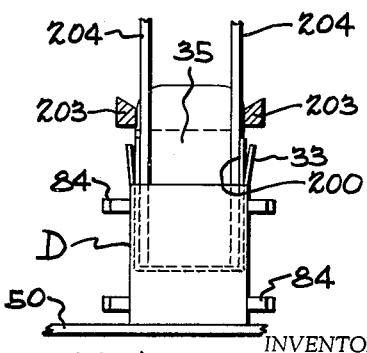

FIGURE 29 is a sectional view taken along line 29—29 of FIGURE 27 showing the leaflet inserting plunger at its lower limit of travel, with the leaflet folded and inserted into the upper portion of the carton, corresponding to the position of the parts in FIGURE 27.

*General arrangement*

As disclosed generally in FIGURE 1, the principles of the present invention are disclosed in relation to a cartoning machine which includes a carton magazine 1 at its upstream end for confining a stack of cartons in flat collapsed condition. The machine includes a carton feed mechanism which withdraws the collapsed cartons individually from the magazine 1, erects the cartons and transfers them in a vertical position to a carton conveyor, which is indicated generally at 2. The carton conveyor 2 moves the erected cartons in a horizontal plane along the length of the machine. After being transferred to the carton conveyor 2, the flaps at the lower end of each carton are folded to a closed position, then a leaflet may be inserted into the open upper end of the carton from a leaflet magazine, indicated generally at 3. The leaflet magazine and feed mechanism, as a unit, comprises an attachment which forms an optional part of the cartoning machine.

The leaflet magazine includes a feed mechanism arranged to withdraw the leaflets individually from the bottom of the magazine, to shift each leaflet laterally to a position above the open upper end of the carton, and to partially insert the leaflet in folded condition into the upper portion of the carton, as described later. Thereafter, the article, such as a bottle, is inserted manually into the open upper end of the carton at the downstream end of the machine, such that the leaflet is folded about the article and forced by the article to the previously closed bottom of the carton. After the article is inserted, the top flaps are folded to a closed position, then the loaded carton is discharged from the machine.

As explained later in detail, the machine is adapted to handle cartons ranging from a relatively small minimum size to a maximum several times greater in size (FIGURE 17). For this purpose, the carton conveyor 2, the carton magazine 1, the leaflet magazine 3, and the several other components of the machine are adapted to be adjusted in a simple, convenient manner in setting up the machine for a given carton size. It will also be understood at this point, that the mechanism for folding and tucking the flaps at the opposite ends of the carton are not included in the present disclosure since this mechanism is not relevant to the present invention.

Referring to FIGURES 8 and 9, the machine includes a horizontal frame structure, indicated generally at 4, having its opposite ends supported by standards 5—5 resting upon the floor and supporting the operating components of the machine at an elevation convenient to the operator. The frame 4 essentially comprises upper spaced parallel rails 6—6 supporting the conveyor 2 and various other components of the machine. The frame structure 4 includes intermediate horizontal support rails 7—7 located below the rails 6. In addition, there is provided a set of lower rails 8, which support the variable speed power unit, indicated generally at 10 (FIGURE 7). The lower rails 8 also support the gear box, indicated generally at 11 (FIGURE 7), which actuates the several components of the machine, as explained later. The several sets of rails include transverse bracing members, for example the cross bars 12 and 13 of the top rails 6—6 (FIGURE 6) to impart rigidity to the structure. The standards 5—5 include pedestals 14—14 (FIGURE 1) at opposite ends to which the end portions of the three sets of horizontal rails are secured.

As shown generally in FIGURE 7, the carton conveyor 2, as a unit, is suspended adjustably from the top rails 6—6. It will be understood at this point, that after the bottom flaps of the cartons are folded to their closed position, the closed lower ends of the cartons rest upon a supporting surface which, as explained later, is mounted upon the intermediate pair of rails 7—7. In order to compensate for the height of the cartons, the supporting structure of the carton conveyor 2 includes a vertical adjustment mechanism, indicated generally at 15 (FIGURE 7) which raises or lowers the self-contained carton conveyor 2 by operation of a removable crank, which is indicated at 16.

The carton conveyor 2 is advanced in step-wise fashion by means of a Geneva gear, indicated generally at 17 (FIGURE 7), which is in driving connection with the power unit 10 through gear box 11. The gear box 11 also operates a cam shaft 18, which extends longitudinally of the machine. The several cams, which drive the operating components of the machine, are mounted upon the cam shaft, as explained later in detail. It will be understood that the gear box 11 operates these several components in synchronism with the intermittent advancements of the carton conveyor 2.

In general, the carton conveyor comprises a first pair of drive sprockets 20—20 (FIGURE 7) journalled at the downstream end of the machine and a second pair of idler sprockets 21—21 journalled at the upstream end of the machine. Upper and lower chain runs 22 and 23 are trained about the respective pairs of sprockets. The upper and lower chain runs 22 and 23, in the form of endless loops, are spaced one above the other and extend for the full length of the cartoning machine.

Figure 3:
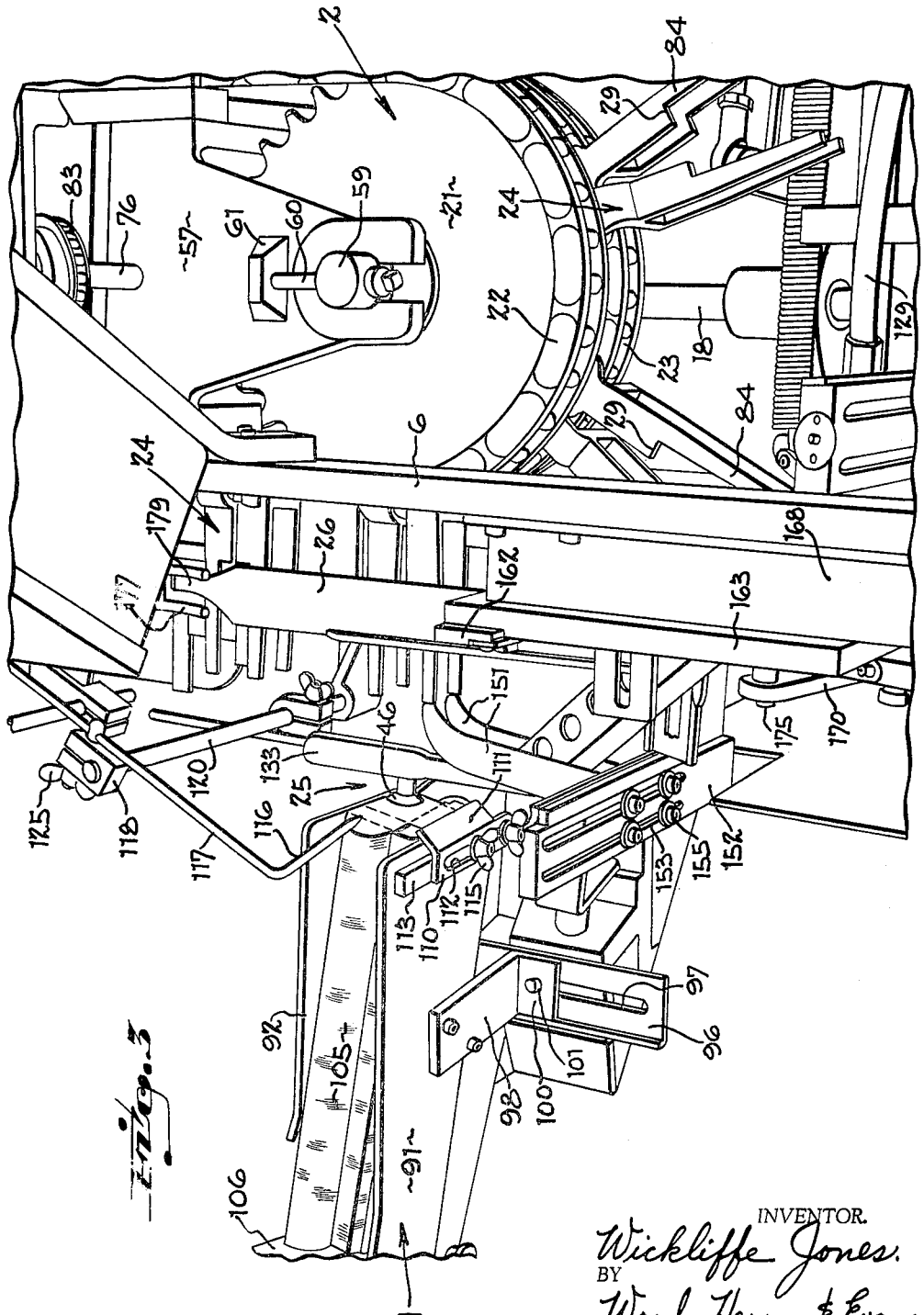
FIGURE 3 is an enlarged fragmentary perspective view, generally similar to FIGURE 2, more completely illustrating the carton magazine and carton feeding mechanism in relation to the upstream end of the carton conveyor, with the parts set up to handle a relatively small size carton.

Each chain run 22 and 23 is provided with a series of generally U-shaped, outwardly projecting conveyor lugs, indicated generally at 24 (FIGURES 4 and 14), which advance with the cartons in the downstream direction as indicated by the arrows in FIGURE 5. The conveyor lugs 24 are arranged in pairs adapted to delineate pockets which receive the cartons as they are withdrawn from the magazine 2 at the upstream end of the machine. As the companion lugs 24—24 pass around the idler sprockets 21—21 at the infeed end, the lugs naturally assume a radial position with respect to one another, such that the pocket, which the adjacent lugs delineate, is slightly larger than the erected cartons which they are to receive. The carton feed or transfer mechanism 25 (FIGURES 3 and 10), as explained later, operates in synchronism with the intermittent or stepwise advancement of the conveyor. The transfer mechanism withdraws, erects and transfers the carton from the magazine 1 into the pocket delineated by the adjacent conveyor lugs 24 at about the same time the lugs pass around the idler sprockets and assume their parallel relationship, as shown in FIGURE 4.

Immediately upstream from the carton feed or transfer mechanism 25 there is provided a reciprocating flap folder, indicated generally at 26 (FIGURES 2-6), which is adapted to push the top flaps forwardly to a flat plane as each carton is advanced beneath a stationary holddown bar, indicated generally at 27. This bar engages the upper open end of each carton to hold it in place in the conveyor pocket while the flap closing mechanism closes the lower flaps to permit the carton subsequently to be loaded.

Figure 4:
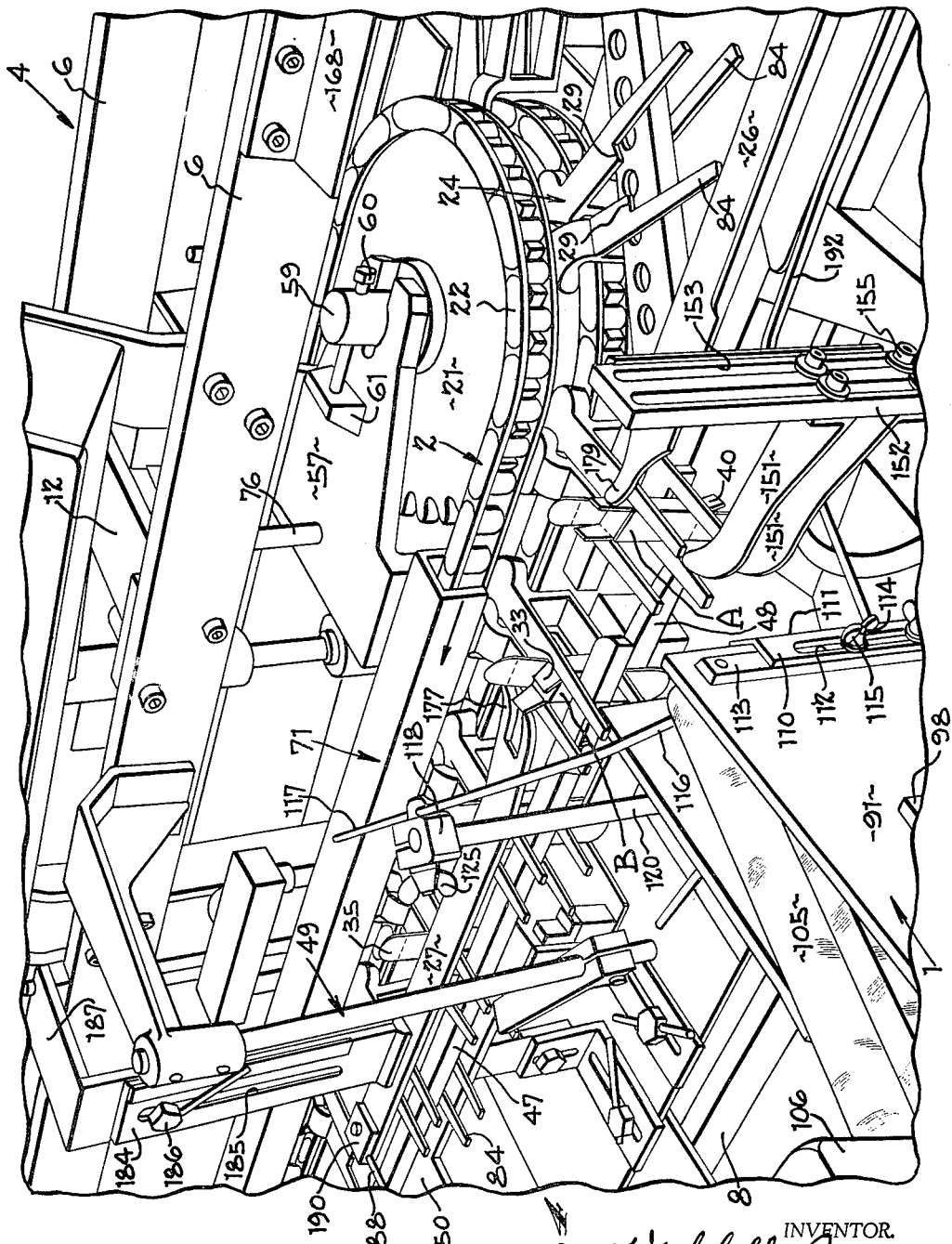
FIGURE 4 is a fragmentary perspective, generally similar to FIGURE 3 but viewed from a different angle in order to bring out more clearly the top flap handling mechanism, with the reciprocating flap folder in a retracted position.

As best shown in FIGURES 2 and 4, each lug 24 includes a shoulder 29 which delineates the inner end of the pocket which is delineated by the lugs 24. As explained later, the arm or arms 133 (FIGURES 14 and 15) of the mouthpieces approach the chains of the conveyor as the mouthpieces reach the limit of reciprocation. The arrangement is such that the mouthpieces release the carton at about the same time the carton engages the shoulders 29. The shoulders therefore provide clearance for the suction cup mechanism, thereby to simplify the structure.

*Operation generally*

The carton, indicated generally at 28 (FIGURES 15-17) represents the maximum size carton which the machine is adapted to handle. As indicated earlier, the components of the machine may be regulated to act upon the maximum size carton 28 or upon intervening sizes down to the minimum size, as indicated at 30 (FIGURES 14 and 17), utilizing the same principles of operation.

Described generally, the cartons (regardless of size) are placed in the magazine 1 in the flat collapsed condition shown in FIGURE 16. It will be understood that the magazine 1 is adjusted to properly confine the stacked collapsed cartons in accordance with their size. Each carton comprises a pair of side wall panels 31—31 and front and rearward panels 32—32. The upper edges of the side wall panels 31 include respective side wall flaps 33—33 which are delineated by score lines 34. The front wall panel 32 (or rear wall panel 32 if desired) includes a closure flap 35 which is delineated by a score line 36, forming a continuation of the score line 34. The outer portion of the closure flap 35 includes a tucking flap 37 which is delineated by a score line 38.

The lower end of the carton includes a similar arrangement of flaps, which are folded to a closed position immediately after the carton is transferred from the magazine to the carton conveyor 2 at the upstream end of the machine. As shown in FIGURE 16, the lower edges of the side wall panels 31—31 include respective side wall flaps 40—40, which are delineated by the score lines 41—41. The front (or rear) wall panel, panel 32, includes a bottom closure flap 42 which is delineated by the score line 43. In the present disclosure, the top closure flap 35 and the bottom closure flap 42 are joined to the opposed wall panels 32—32. The bottom closure flap 42 (similar to the top closure flap 35) includes a tucking flap 44 delineated by a score line 45.

As noted above, the collapsed cartons 28 are withdrawn individually from the end of the magazine by a suction mouthpiece 46 (or a pair of mouthpieces—FIGURES 14 and 15) which reciprocates in time with the intermittent advancement of the carton conveyor 2. The arangement is such that the collapsed carton is erected as it is picked up by the suction mouthpiece 46 and transferred into the pocket which is delineated by the companion lugs 24—24 (FIGURE 14) of the carton conveyor 2. During transfer from the magazine and erection, the top side flaps 33, the top closure flap 35, the bottom side flaps 40, and the bottom closure flap 42 all remain in their outwardly projecting positions in plane with the panels to which they are joined.

As shown in FIGURE 14, in handling the small size cartons the feed and transfer mechanism utilizes the single suction mouthpiece 46, which is arranged to engage the main panel 32 of the carton at a point midway along its length. However, in handling the larger cartons (FIGURE 15), the transfer mechanism utilizes a pair of suction mouthpieces 46 which engage the main panel 32 at points spaced apart from one another in symmetrical relationship along the length of the carton.

The carton is engaged against the shoulders 29 at about the same time the suction mouthpiece or mouthpieces 46 release the carton and dwell in a retracted position (FIGURES 14 and 15) while the carton is confined lightly between the lugs. At this point, the top flap folder 26 shifts in the downstream direction (FIGURE 5) passing across the top flaps 33—33 and folding them in a horizontal position. A bottom flap folder 192 (which moves in unison with the top flap folder), engages the lower end of the carton, such that it is supported in the pocket of the conveyor by the upper and lower flapfolders. At the downstream limit of motion (FIGURE 6) the top flap folder dwells in a stationary position with its forward end adjacent the stationary hold-down bar 26, while the bottom flap folder dwells adjacent the stationary bottom rail 48. At this time the conveyor 1 advances in stepwise fashion in the downstream direction, as indicated by the arrow in FIGURE 6.

As shown in FIGURE 4, the erected carton, at this stage, is confined in the pocket of the conveyor by the stationary retainer rail 47 which extends parallel with the downstream run of the conveyor and in sliding engagement with the front wall 32 of the carton. It will be noted that the rail 47 is straddled by the upper and lower pairs of conveyor lugs 24. Briefly therefore, the sides 31—31 of the erected carton are embraced by the companion lugs 24—24, the rear wall 32 of the carton is confined against the shoulders 29 provided by the lugs 24, the front wall 32 is slidably engaged by the retainer rail 47 and the ends are confined between the slide rails 27 and 48.

After passing across rail 48, and during passage of the cartons beneath the stationary hold-down bar 27, a bottom flap folding mechanism, indicated generally at 49 (FIGURES 4 and 8) folds both side flaps 40—40 to a closed position, then folds and tucks the bottom closure flap 42 over the side flaps 40, thus closing the lower end of the carton. With its bottom thus closed, the carton advances to a stationary slide plate 50 (FIGURE 4) which slidably engages the bottom of the carton to support the carton as it is advanced by the conveyor.

It will be noted in FIGURE 4, that during passage along the hold-down bar 27, the top closure flap 35 remains in its vertical position. After passing beyond the end of the hold-down bar 27, the upper side flaps 33—33 are sprung back to their vertical position in order to receive the leaflet and the article (FIGURE 6).

As shown in FIGURE 1, the slide plate 50 extends along the downstream run 51 of the conveyor 2 to the top surface 52 of the pedestal 14 at the downstream end 53 of the machine. A slide plate (not shown) similar to the plate 50, extends from the surface 52 along the upstream run of the conveyor, so as to support the carton as the top flaps of the loaded carton is folded to the closed position. The slide plates 50 preferably are supported by the intermediate rails 7 along opposite sides of the machine.

With the lower ends of the cartons resting upon the slide plate 50, the intermittently advancing cartons successively move to a position in alignment with the leaflet magazine 3, if the machine is so equipped, as indicated in FIGURE 1. At this point, each carton dwells in alignment with the magazine 3 while a leaflet is withdrawn from the bottom of the magazine, shifted laterally to a position above the stationary carton, then partially inserted into its open upper end.

After the leaflet is thus partially inserted, the carton continues in its stepwise progression toward the downstream end 53 of the machine. In the present example, the articles are fed into the cartons manually. In practice, the operator loads the articles into the upper ends of the cartons at or near the downstream end 53, such that the partially inserted leaflet is engaged and forced to the bottom of the carton by the article as it is inserted. It will be noted in FIGURE 1, that the retainer rail 47 continues around the downstream end of the conveyor in the form of an arc 54 which is concentric with the axis of rotation of the drive sprockets 20. In addition, there is provided a second pair of rails 55—55, also in the form of an arc which engage the rearward wall of the cartons as they pass around the drive sprockets 20. As noted earlier, the conveyor lugs 24—24 naturally assume radial positions with respect to one another as they pass around the sprockets. The arcuate rails 55—55 thus guide the cartons in passing around the downstream sprockets to prevent displacement as the shoulders of the lugs spread apart radially.

After passing around the sprockets 20 at the downstream end, the loaded cartons continue their stepwise advancement in the opposite direction along the upstream run of the conveyor 2, which is indicated generally at 56 in FIGURE 1. During this motion, the top side flaps 33—33 and top closure flap 35 are folded to their closed position by a flap closing mechanism. This mechanism does not form a part of the invention and therefore has not been disclosed.

After the top flaps of the carton have been closed, the loaded cartons continue advancing along the upstream run of the conveyor 2 until they reach a discharge station, as explained later. At this point, the cartons are intercepted by a reciprocating arm which shifts the loaded and closed cartons laterally from the lugs of the conveyor for discharge from the machine. The cartoning machine may be equipped with suitable conveyors for transporting the articles toward the charging or downstream end of the machine and also for delivering the loaded cartons from the upstream end of the machine. These conveyors do not form a part of the invention and therefore have not been disclosed.

Carton conveyor structure

As noted earlier, the carton conveyor 2 is mounted for vertical adjustment as a unit with respect to the stationary slide plate 50, which supports the lower ends of the cartons after the bottom flaps are folded. In general, the conveyor comprises a pair of spaced mounting brackets 57—57 at the upstream end of the machine (FIGURES 3 and 7) and a mounting bracket 58 at the downstream end of the machine. The idler sprockets 21—21 at the upstream end are journalled upon a stub shaft 59 carried by the brackets 57—57. The stub shaft includes adjustment screws 60—60 having their outer ends engaging lugs 61—61 projecting from the brackets 57 to adjust the tension of the conveyor chains.

The driving sprockets 20—20 at the downstream end of the conveyor are mounted upon a drive shaft 62 having its upper end journalled in a bracket 63 projecting from the end of the top rail 6 of the machine frame (FIGURE 7). The lower portion of drive shaft 62 interfits a bearing sleeve 64 projecting upwardly from a bracket 65 rising from the bottom rail 8. The drive shaft 62 provides a slidable keyed connection with the hub 66 of a slotted disk 67, which forms part of the Geneva drive 17. The Geneva drive is conventional, comprising the slotted disk 67 and a rotating arm 68 having a roller 70 at its outer end. The arm 68 is rotated continuously by the shaft of gear box 11, such that the roller 70 passes successively through the slots of the disk 67 to advance the disk in stepwise fashion, one step for each turn of the arm 68 and its roller. The disk 67 thus advances the drive shaft 62 and conveyor intermittently.

The chain runs 22 and 23 of the conveyor are confined in respective chain guides indicated generally at 71—71 (FIGURES 7 and 21) extending along the downstream and upstream runs of the conveyor. Each guide rail comprises a bar 72 having opposed roller guides 73—73 engageable with the rollers of the conveyor chains. The bar 72 includes angle irons 74—74 which support the outer roller guides 73. The opposite ends of the chain guides 71 are rigidly secured to the mounting brackets 57 and 58, such that the conveyor forms a self-contained unit.

In order to raise or lower the conveyor relative to the fixed slide plates 50 along opposite sides of the machine, the conveyor is suspended from the top rail 6 by the adjustment shafts 75 and 76 (FIGURE 7). The adjustment shafts 75 and 76 are threaded and their lower ends pass through respective nuts 77 and 78 which form a part of the mounting brackets 57 and 58 at opposite ends of the conveyor. The upper end of adjustment shaft 76 is rotatably journalled in a thrust bearing 80 which is supported by a cross bar 12 of top rail 6. The adjustment shaft 75 passes through a similar thrust bearing 81 forming a part of bracket 63, which is attached to the top rail 6.

As shown in FIGURE 7, the adjustment crank 16 is attached directly to the upper end of shaft 75. In order to rotate both shafts 75 and 76 in unison, the shafts are provided with respective sprockets 82—82 meshing with a sprocket chain 83. Rotation of crank 16 thus rotates both shafts in unison to raise or lower the conveyor assembly relative to the stationary slide plate 50, thereby to compensate for the length of the cartons which are being handled.

In order to compensate for the width of the cartons, the pairs of drive sprockets 20—20 and idler sprockets 21—21 may be turned relative to one another to an adjusted position, thereby to vary the width of the pockets which are delineated by the companion pairs of conveyor lugs 24—24 (FIGURES 4 and 21). As shown in these views, each conveyor lug 24 is generally U-shaped, providing upper and lower limbs 84—84. The lugs are located above the slide plate 50 and the conveyor is adjusted to an elevation which brings the limbs into contact with the sides of the cartons at points symmetrical along the length of the carton. Each lug 24 includes a connector 85 or 86 which provides a pivotal connection with the upper or lower chain run 22 or 23, such that the lugs are connected alternately to the upper chain run 22 and lower run 23. Relative rotary adjustment of the upper and lower sprockets 20 and 21 thus shifts the upper and lower chain runs to vary the size of the pockets which are delineated by the adjoining lugs.

In order to make this adjustment (FIGURE 7), the upper sprocket 20 at the downstream end of the machine is provided with an arcuate slot concentric with shaft 62. The lower sprocket 20 is keyed to the drive shaft 62 and the upper sprocket is rotatable relative to the drive shaft. A bolt 87 passes through the slot and into threaded engagement with the lower sprocket 20 to lock the two sprockets in adjusting position with respect to one another. In the present example, the bolt is omitted from the idler sprockets 21—21; however, these sprockets are free to rotate with respect to one another about the shaft 59 to permit the adjustment.

Carton magazine

As noted earlier, the carton magazine 1 is mounted at the upstream end of the machine and is arranged to be adjusted to the size of the cartons in a simple, convenient manner. As shown generally in FIGURES 1, 10–13, the magazine 1 is supported by a mounting plate 88 which projects outwardly from the machine frame 4. A bracket 90 rises from the mounting plate 88 and is arranged to support the magazine at an elevation related to the carton supporting slide plate 50. The arrangement is such that the collapsed cartons are withdrawn by the suction mouthpiece 46 of the carton transfer mechanism 25, erected and transferred directly into the pockets of the carton conveyor. As noted earlier, the carton transfer mechanism 25 in relation to the magazine 1 is shown generally in FIGURES 3–6.

As detailed in FIGURES 10–13, the magazine 1 is mounted in a downwardly inclined plane to provide gravity feed of the collapsed cartons and to present them in an upright position to the transfer mechanism 25. The magazine comprises a pair of vertical side plates 91 and 92 and an intermediate plate 93 rising from a base structure 94 which is supported by bracket 90. As best shown in FIGURE 13, the intermediate plate 93 is secured by an angle iron 95 in a fixed position with respect to the base structure 94. A pair of horizontal adjustment plates 96—96 project outwardly from opposite sides of the intermediate plate 93; the adjustment plates 96 are slotted laterally as at 97—97 (FIGURE 12) to permit the side plates 91 and 92 to be adjusted laterally with respect to the intermediate plate 93 which forms the main support of the magazine.

For adjustment purposes, the side plates 91 and 92 each includes a vertical bracket 98, each bracket having a foot portion 100 (FIGURE 13) which is seated upon the horizontal adjustment plate 96. In order to stiffen the outer cantilever portion of the magazine, there is provided a similar adjustment plate 96, which is also attached to the intermediate plate 93. The side plate 91 includes a second vertical bracket 98, also having a foot 100 seated upon the adjustment plate 96.

Each foot of the several vertical brackets includes a bolt 101 passing through the slot 97 of the adjustment plate 96, each bolt having a nut seated against the lower surface of plate 96. By loosening these bolts the side plates 91 and 92 may be adjusted transversely to accommodate any given size carton within the range of the machine. As shown in FIGURES 12 and 13, the side plates 91 and 92 are adjusted for the maximum sibe carton in collapsed condition.

As viewed in FIGURE 12, the collapsed cartons each include a slot 102 located between one of the bottom flaps 40 and the bottom closure flap 42. The intermediate plate 93 of the magazine loosely interfits this slot, thereby permitting the blanks to be fed by gravity toward the discharge end of the magazine.

As viewed in FIGURE 11, the intermediate plate 93 and side plate 91 are provided with upper edges which are inclined downwardly as at 103—103. The inclined edges 103 blend with curved portions 104—104. This arrangement permits the cartons to be fed by gravity for the discharge end of the magazine while presenting the cartons to the feed mechanism in a vertical position to be transferred to the conveyor by the suction mouthpiece 46.

As viewed in FIGURE 10, the cartons are placed manually in the magazine in stacked formation, as indicated at 105. The weight load of the stack rests upon the downwardly inclined upper edge 103 of the intermediate plate 93. The cartons in the inclined portion of the magazine are stabilized laterally by the side plate 91; however, as the cartons approach the lower curved portion 104 of the magazine the opposite side edge of the stack is guided by the arcuate side plate 92 (FIGURE 11). As viewed in FIGURES 11 and 12, the side plate 92 is of arcuate form and terminates at the lower end of the inclined edges 103.

In order to aid in feeding the cartons by gravity toward the pick-off end of the magazine, the magazine is provided with a sliding weight 106 (FIGURES 6 and 10). The weight is preferably formed of wood and includes a slot 107 in its lower portion which rides upon the intermediate plate 93, similar to the collapsed cartons. The sliding weight 106 is shifted upon the inclined portion of the magazine when the supply of cartons 105 is replenished. The magazine preferably includes an electrical vibrator unit (not shown) of conventional design, arranged to impart vibratory motion to aid in feeding the cartons.

The forward or pick-off end 108 of the magazine is provided with a retainer plate 110 (FIGURE 10) which overhangs the forward end of the side plate 91 and engages the side portion of the forward carton in the magazine. The retainer plate 110 confines the stack in the magazine but permits the cartons to be withdrawn individually by the suction mouthpiece 46, as explained later. The retainer plate 110 is in the form of a vertical bar attached to the side plate 91 and having an angular portion 111 which overhangs the forward edges of plate 91.

The retainer plate 110 is mounted for vertical adjustment relative to side plate 91 to compensate for the length of the carton (FIGURES 3–6). For this purpose, the plate 110 is slotted longitudinally as at 112. The plate 110 is secured to a vertical bar 113 projecting upwardly along the side plate 91 and having a pair of threaded studs 114 projecting outwardly through the slot 112. Each stud 114 includes a wing nut 115 which clamps the retainer bar 110 in its adjusted position with respect to the bar 113.

In order to control the top closure flap 35 and tucking flap 37 of the carton as it is withdrawn from the end of the magazine, there is provided a flop retaining rod 116 which projects downwardly from a mounting rod 117 (FIGURES 11–13). The retaining rod 116 engages the tucking flap 37 and a portion of the closure flap 35. As the carton is withdrawn from the magazine, the flaps spring rearwardly as they pass beneath the flap retainer rod 116.

In order to adjust its position, the mounting rod 117 is mounted in a slide block 118 which is adjustably mounted upon a vertical bar 120 (FIGURES 11–13). The lower portion of the bar is secured in a bracket 121 which is mounted upon a rail 122 forming a part of the machine frame. To permit vertical adjustment of the flap retaining rod 116, the slide block 118 is split as at 123 (FIGURE 11) and a clamping bolt 124 passes through the slotted portion to provide a clamping action with respect to the vertical bar 120. The mounting rod 117 passes through one end of bolt 124 and a wing nut 125 is threaded upon its opposite end. This arrangement permits the rod 117 to be adjusted in the lengthwise direction with respect to the slide block; permits the rod to be adjusted angularly with respect to the slide block; and also permits the assembly to be shifted bodily along the bar 120, thereby to compensate in a convenient manner for the size of the collapsed cartons for which the magazine is adjusted.

*Carton transfer mechanism*

The carton transfer mechanism, previously indicated at 25 (FIGURES 2–6), includes the suction mouthpiece 46, which withdraws the collapsed cartons individually from the pick-off end 108 of the carton magazine 1, erects the carton and transfers it into the pocket which is delineated by the adjacent lugs 24 of the carton conveyor 2. In general, the suction mouthpiece 46 reciprocates at a horizontal path between the pick-off end of the magazine and the pocket of the conveyor lugs during the dwell period of the carton conveyor 2. As the carton is transferred into the pocket of the conveyor 1, as indicated at A (FIGURE 4), the flap folding bar 26 resides in its retracted dwell position.

After the carton is thus transferred, the carton conveyor is advanced in stepwise fashion to advance the carton to the position indicated at B (FIGURE 4). At this point, the flap folding bar 26 is shifted in the downstream direction (with the conveyor 2 stationary) as shown in FIGURES 5 and 6, thereby to push the top flaps 33—33 to a horizontal position. Thus, the carton may now be advanced with its upper end in engagement with the hold-down bar 27, while the bottom flaps are folded to the closed position, as noted earlier. In handling the larger size cartons, the transfer mechanism 25 is provided with two spaced mouthpieces 46 which straddle the conveyor lugs 24 (FIGURE 15) so as to engage the opposite end portions of the carton rear wall at points symmetrically located. When handling the small size cartons, a single suction mouthpiece 46 is utilized (FIGURE 14), the single mouthpiece being straddled by the limbs 84—84 of the lugs 24. It will be understood that the transfer mechanism is identical in either case and that it is arranged for mounting either the pair of mouthpieces or the single mouthpiece in a convenient manner, as explained below.

It will be understood at this point that the machine includes a vacuum pump communicating with the suction mouthpieces of the carton magazine 2 (and also in communication with the suction mouthpiece of the leaflet magazine 3). The pump is arranged to apply vacuum to the mouthpiece (or mouthpieces) when it is seated against the rear wall of the carton, as shown in broken lines in FIGURE 10, and to apply atmospheric pressure to the mouthpiece 46 to release the carton after it has been erected and transferred to the conveyor pocket, as shown in full lines in FIGURE 10.

Described in detail (FIGURES 8–10), the transfer mechanism comprises a crosshead 128 mounted for reciprocation transversely of the machine along a slide bar 130. Slide bar 130 has its opposite ends mounted in the vertical brackets 131 and 132, which form a part of the machine frame 4. The suction mouthpiece is mounted upon the outer end of an angular arm 133 having a mounting block 134 secured to the crosshead 128 (FIGURE 10). It will be understood at this point, that the crosshead 128 includes a vertical flange 135 (FIGURE 8) adapting the arm 133 to be mounted for reciprocation in a selected horizontal plane. Thus, as shown in FIGURE 14, the arm 133 for the single mouthpiece 46 is secured to the flange 135 in a plane disposed between the limbs 84—84 of the conveyor lugs 24. When two mouthpieces are required, as shown in FIGURE 15, two arms 133 are mounted upon the flange 135 in the same manner but spaced apart from one another in accordance with the length of the carton.

As shown in FIGURES 14 and 15, the arm or arms 133 are tubular in cross section. The suction mouthpiece is formed of rubber or a similar resilient material. The mounting collar 136, and the mouthpiece itself, includes an aperture communicating with the interior of the hollow arm 133. Suction and atmospheric pressure is supplied to the hollow arm by way of a flexible conduit 129 (FIGURES 2 and 3) communicating with the vacuum pump. A valve (not shown) is interposed in the vacuum lines and is operated in synchronism with the other components of the machine to apply and relieve the vacuum in time with the reciprocations of the arm 133 and its mouthpiece 46.

The suction mouthpiece 46 is reciprocated by a cam 137 (FIGURES 7–10) which is keyed to the cam shaft 18. For reciprocating the mouthpieces, there is provided a cam lever 138 pivotally connected as at 140 to a bracket 141 depending downwardly from the lower rail 8 of the machine frame. Intermediate the length of the cam lever 138 there is journalled a cam follower roller 142 which is confined in a cam track (not shown) formed in the cam 137. The cam track is designed to reciprocate the suction mouthpiece through a complete stroke to transfer the carton from the magazine to the pocket of the carton conveyor during the conveyor dwell period. In the present example the stroke of the suction mouthpiece is completed during each revolution of the cam shaft 18 and cam 137.

The swinging end of cam lever 138 is connected to the crosshead 128 of the suction cup by a link 143. The rearward end of the link is pivotally connected to the lever 138 as at 144. The forward end of the link is pivotally connected to the crosshead as at 145. In order to confine the crosshead 128 against rotary motion, there is provided a downwardly depending bracket 146, the lower end of which includes a roller 147 (FIGURE 9). Roller 147 is confined in a slot (not shown) which is formed in a guide plate 148 extending transversely of the machine frame.

In order to erect the carton as it is withdrawn from the pick-off end 108 of the magazine (FIGURES 4–6), the machine is provided with a pair of stationary erecting fingers 151—151 mounted in a horizontal plane between the pick-off end of the magazine and pockets of the conveyor. These fingers aid in erecting the carton after it has been withdrawn from beneath the retainer plate 110 and before it reaches the conveyor pocket.

In order to compensate for the length of the carton, the erecting fingers 151 are mounted for vertical adjustment upon a stationary bar 152 which forms a part of the machine frame 4. The bar is slotted vertically as at 153—153 and each finger 151 includes a mounting flange 154 seated against the bar 152. The erecting fingers 151 are clamped in their adjusted positions by means of screws 155 passing through the slots 153 and threaded into the mounting flanges 154. In setting up the machine, the erecting fingers are mounted in planes which are located at spaced symmetrical relationship to the length of the carton.

As best shown in FIGURE 10, the outer end portions of the erecting fingers are curved in the downstream direction, as indicated at 156. The end 157 of the curved portion 156 resides substantially in alignment with the trailing side of the conveyor pocket during the stationary dwell period of the conveyor lugs 24. The curved ends 157 intercept the side wall 31 of the carton as it is withdrawn from the magazine, causing the carton to be erected as it is transferred to the conveyor pocket. After the carton is erected and seated in the conveyor pocket, as indicated in full lines 158 in FIGURE 10, atmospheric pressure is admitted to the mouthpiece 46 to release the carton, then the mouthpiece retracts to a dwell position spaced slightly from the carton wall, as indicated in FIGURES 14 and 15. At this point, the conveyor advances the carton from the position indicated at A to the position indicated at B (FIGURE 4), as explained earlier, then the flap folders 26 and 192 are reciprocated through their operating stroke.

In the present disclosure, the leaflet folds itself about the bottom portion of the article, since the article is inserted in upright position from the upper end of the carton. However, in the event that it is desired to package the cartons with the leaflet passing across the upper end of the article, then the carton feed mechanism is modified slightly, as described below, to feed the cartons reversed end-for-end. In this case, the leaflet is inserted into which is now the opposite end of the carton, then the article is inserted in a reversed end-for-end position, such that the leaflet is partially folded across the upper end portion of the article. Thereafter, the closed carton is turned back to its upright position, such that the leaflet is withdrawn with the article when the top flaps are opened.

In order to convert the machine, the position finger of the carton erecting fingers 151 is reversed, as indicated by the broken line 151A in FIGURE 10. By this arrangement, the curved end portion of the finger cams across the opposite side wall of the reversed carton to erect it in the same manner as disclosed with reference to the fingers 151 in FIGURE 10.

*Flap folding apparatus*

As explained earlier, the reciprocating flap folder 26 (FIGURES 3–6) acts upon the top side flaps 33—33 after the carton is transferred from the magazine, erected and placed in the pockets of the conveyor. A similar flap folder, arranged to act upon the bottom side flaps 40—40, reciprocates in unison with folder 26. As best shown in FIGURES 5 and 6, the flap folders are reciprocated in time with the intermittent advancements of carton conveyor 2 by a cam 159. Cam 159 is mounted upon a shaft 160 projecting from a gear box 161 at right angles to the main cam shaft 18. The flap folder 26 comprises a horizontal bar mounted upon a bracket 162 which depends downwardly from the upper portion of a reciprocating carriage 163. Carriage 163 is generally U-shaped (FIGURES 8 and 9) and includes upper and lower pairs of rollers 164—164 and 165—165 journalled on stub shafts 166—166 mounted in the carriage. The pairs of rollers 164 and 165 are tracked upon respective guide rails 167—167, which are mounted upon angle irons 168. The angle irons are secured to the top rails 6—6 and intermediate rails 7 which form a part of the machine frame.

The carriage 163 is reciprocated along the rails in a path parallel with the path of motion of conveyor 2 by operation of the flap folder cam 159 (FIGURES 8 and 9). For this purpose, there is provided a cam lever 170 having its lower end pivotally connected as at 171 to a bracket 172 depending from the lower rail 8. Lever 170 includes a cam roller 173 confined in the track (not shown) of the flap folder cam 159. The upper end of lever 170 includes a link 174 pivotally connected as at 175 to the upper end of the lever. The opposite end of link 174 is pivotally connected as at 176 to the carriage 163.

The carriage 163 and flap folder 26 are shown in the retracted position in FIGURES 4 and 8. After the carton is erected and transferred to the pocket of the carton conveyor, the flap folder 26 is shifted in the downstream direction (FIGURE 6). As shown in this view, the forward end portion of the flap folder 26 includes an upwardly curved finger 179 which interfits the upwardly curved fingers 177—177 of the stationary hold-down bar 27. The track of the flap folder cam 159 is arranged to provide a dwell period when the flap folder 26 reaches the limit of its downstream motion (FIGURE 6).

It will be noted (FIGURE 5) that during its downstream motion, the flap folder 26 will have bent both top flaps 33 of the newly-erected carton A and also of the previously erected carton B to a horizontal plane in the downstream direction. During the next intermittent advancement of conveyor 2, the previously erected carton B will advance to a position beneath the hold-down bar 27 (FIGURE 6). The curved fingers 179 and 177 of the reciprocating flap folder 26 and hold-down bar 27 permit the carton to be transferred to its position beneath the stationary bar 27 without interference with the side flaps.

In order to permit the flap folder 26 to be adjusted vertically relative to slide plate 50 to compensate for the size of the carton, the mounting bracket 162 (FIGURE 6) is slotted vertically as at 178. A screw 180 passes through slot 178 into threaded engagement with the carriage. The right angular foot 181 of bracket 162 also includes a slot 182 traversed by a screw 183 which is threaded into the reciprocating flap folder 26 to permit lateral adjustment of the flap folder.

The stationary hold-down bar 27 is similarly mounted for vertical adjustment to a plane parallel with the reciprocating flap folder. For this purpose, the stationary bar 26 is supported by a vertical bar 184 (FIGURE 6) which includes a slot 185. A screw 186 passes through the slot into threaded engagement with an angle iron 187 which is attached to the top rail 6.

The downstream end of the stationary bar 27 includes a U-shaped rod 188 extending in a horizontal plane and carried by a mounting block 190 (FIGURE 6). As the cartons emerge from the downstream end of bar 27, the limb 191 of rod 188 intercepts the side flaps 33 and erects the flaps so as to open the ends of the carton to receive the leaflet and article which are subsequently inserted.

As viewed in FIGURES 5 and 8, a bottom flap folder 192 is attached to the lower portion of the carriage 163 by means of a mounting block 193. The folder 192 is disposed in a horizontal plane in a position to act upon the side flaps 40—40 at the lower end of the carton. As the carriage moves in the downstream direction, the flap folder 192 engages and folds the lower flap 40 on the trailing side of the carton in a forward direction at about the same time the flap 40 on the leading side is intercepted by the bottom rail 48. This causes both bottom flaps 40 to be folded toward one another across the bottom of the carton. The lower closure flap 42 subsequently is folded to its closed position by the lower flap folding mechanism 49 (FIGURE 5), such that the cartons emerge from the downstream end of the hold-down bar 27 with the bottom flaps closed and advanced upon the slide plate 50, as explained earlier.

The mechanism for closing and tucking the top and bottom closure flaps 35 and 42 does not form a part of the present invention and therefore has not been disclosed in detail. It will be understood that the closing mechanism for the bottom flap 42 includes a reciprocating member arranged to close and tuck the closure flap 42 after the side flaps 40—40 have been closed. The reciprocating flap closing element is operated by a cam 194 (FIGURE 7) which is mounted on the cam shaft 18. The top flap 35 is closed in the same manner after the top side flaps have been folded to closed position during advancement along the upstream run of the machine. This mechanism also includes a reciprocating member for tucking the top flap 35. This mechanism is reciprocated by a cam 195 (FIGURE 7), also mounted on the cam shaft 18. It will be understood that this mechanism is also adjustable to accommodate the various carton sizes which are handled by the machine.

Leaflet magazine

As shown generally in FIGURES 1 and 18, the leaflet magazine 3 and its feed mechanism comprise a self-contained unit which is mounted downstream from the lower end of the stationary hold-down bar 27. The unit is in the form of an attachment which is mounted in a convenient manner upon the machine if it is to be set up to insert the leaflets into the cartons. The feed mechanism 196 of the leaflet magazine is driven by a sprocket 197 (FIGURE 7) which is mounted upon the cam shaft 18 and arranged to drive the feed mechanism in synchronism with the other components of the machine. As noted earlier, the leaflet magazine and its feed mechanism are also arranged to be adjusted to the size of the leaflets.

Described generally, the leaflet feed mechanism 196 comprises a suction mouthpiece 198 (FIGURES 21–29) connected for reciprocation in a vertical path beneath the magazine 3 and arranged to withdraw the individual leaflets 200 individually from the stack of leaflets 201 confined in the magazine 3. After the leaflet is partially withdrawn from the magazine, a reciprocating leaflet pusher 202 advances from a retracted position in a horizontal plane (FIGURES 23–26) to transfer the leaflet 200 laterally to a position above the open end of the carton which is resting upon the slide plate 50. As the pusher 202 reaches its advanced position, its forward end engages the upper end of the top closure flap 35 and bends the flap rearwardly to facilitate insertion. At this point, the leaflet is supported upon a pair of spaced stationary rails 203—203 (FIGURES 28 and 29), which extend laterally in cantilever fashion from the leaflet magazine 3. After the leaflet 200 is thus positioned, a pair of spaced vertical plungers 204—204 move downwardly between the spaced rails 203 so as to engage the leaflet in its midportion and to force it downwardly. As the plunger passes downwardly between the rails 203, the endwise portions of the leaflet 200 are bent upwardly by the rails 203, then the leaflet is forced into the upper portion of the carton (FIGURE 29). It will be understood at this point that the rails 203 and plungers 204 are adapted to be adjusted laterally to accommodate the carton size.

Described in detail (FIGURES 18–21), the leaflet magazine 3 and its feed mechanism 196 are mounted upon a pedestal 205 rising from a mounting plate 206 carried by the lower rails 8—8 of the machine frame. In order to adjust the mechanism vertically with respect to the slide plate 50 to compensate for the length of the carton, the feed mechanism and magazine, as a unit, is mounted upon a vertical bracket 207. For adjustment purposes, pedestal 205 includes vertical slots 208; the vertical bracket 207 is secured at its adjusted position by screws 210 (FIGURE 21) passing through the slots 208 into threaded engagement with bracket 207. The bracket 207 is adjusted vertically with respect to pedestal 205 by a vertical adjustment screw 211 having a hand wheel 212 at its lower end (FIGURE 18).

The leaflet magazine 3 comprises a pair of vertical angle pieces 213—213 mounted for lateral adjustment with reference to the vertical bracket 207. The angle pieces 213 overlie the forward edge of the stack of leaflets 201, which is placed manually in the magazine. The side and rearward portions of the stack are confined within the magazine by a second pair of angle pieces 214—214, which are adjustably secured to the angle pieces 213. It will be understood at this point, that the magazine, as shown in FIGURES 18 and 19, is adjusted to accommodate the maximum size leaflet, corresponding to the setting of the carton magazine, as described earlier.

In order to provide adjustment of the magazine 3 to accommodate for the length of the leaflets, the angle pieces 213—213 are secured to an adjustment plate 215 rising from the vertical bracket 207 (FIGURES 19 and 20). Adjustment plate 215 includes a transverse slot 216 traversed by screws 217—217 which are threaded into the angle pieces 213. In order to hold the angle pieces 213 firmly in their upright position, the adjustment plate 215 includes a cross key 218 (FIGURE 21) interfitting traverse keyways formed in the forward surface of the angle pieces 213. The angle pieces 213 are shown in FIGURE 20 in a position to accommodate a stack of shorter leaflets.

To compensate for the width of the leaflets, the angle pieces 214 may be adjusted laterally with respect to the angle pieces 213. For this purpose, the angle pieces 213 each include a pair of horizontal slots 221—221 (FIGURE 22) near their opposite ends. These slots are traversed by respective screws 222—222 which are in threaded engagement with the angle pieces 214. It will be noted that the angle pieces 213 provide right angular flanges which embrace the forward portion of the leaflet stack 201, while the angle pieces 214 provide right angular flanges which embrace the rearward corner portions of the stack at opposite ends. In order to facilitate filing the magazine, the upper end portions of the angle pieces 213 and 214 are inclined outwardly at as 223 (FIGURE 22).

*Leaflet feed mechanism*

As noted earlier, the feed mechanism 196 of the leaflet feed magazine is driven by the sprocket 197 of cam shaft 18 (FIGURES 7, 18 and 22). Sprocket 197 reciprocates the leaflet pusher 202 in its horizontal path. In addition, cam shaft 18 includes an eccentric 224 which actuates the vertically reciprocating leaflet inserting plungers 204 (FIGURES 28 and 29).

Described in detail (FIGURES 18–22), the suction mouthpiece 198 and leaflet pusher 202 are reciprocated in time with one another by a crank disk 225 which is journalled for rotation upon a stub shaft 226 projecting outwardly from the vertical bracket 207. A sprocket 227 is keyed to the disk 225 and is driven from the cam shaft by a sprocket chain 228 which is trained about the sprockets 197 and 227. The sprocket driving system rotates the crank disk 225 at the same speed as cam shaft 18, such that the components of the leaflet feed mechanism operate in time with the stepwise advancements of the carton conveyor. It will be understood at this point, that the drive mechanism for the suction mouthpiece 198 and leaflet pusher 202 is shiftable vertically with the leaflet magazine 3 upon vertical adjustment of the screw 211.

In order to permit vertical adjustment of the feed mechanism, there is provided an idler sprocket 230 journalled on a stub shaft 231, which is attached to a bracket 232 (FIGURES 18, 21 and 22) forming a part of the machine frame. The bracket is slotted as at 233 to permit the stub shaft 231 and idler sprocket 230 to be shifted in response to vertical adjustment of the bracket 207, thereby to control the tension of chain 228.

The leaflet pusher 202 is carried by an angle bracket 234 (FIGURES 18, 21 and 22) having its vertical leg attached to a slide block 235. Slide block 235 is of dovetail shape and interfits the dovetail way of a stationary guide rail 236 which is mounted upon vertical bracket 207. As viewed in FIGURE 21, the pusher 202 projects in cantilever fashion from its support bracket 234.

The pusher 202 is reciprocated by a crank pin 237 projecting outwardly from the crank disk 225 (FIGURES 21 and 22). For this purpose, there is provided a bell crank lever 238, pivotally mounted upon a stub shaft 240 projecting outwardly from bracket 207. An adjustable link 241 is pivotally connected as at 242 to the lower end of bell crank lever 238; the opposite end of the link is pivotally connected to the crank pin 237.

The upper end of bell crank lever 238 includes an adjustable link 243 pivotally connected as at 244 to lever 238. The opposite end of link 241 is pivotally connected to a pin 245 projecting from the angle bracket 234. The throw of the crank pin 237, combined with the leverage of bell crank lever 238, shifts the pusher 202 from the retracted position of FIGURE 21 to the advanced position of FIGURE 22 during each rotation of disk 225. The adjustable links 241 and 243 permit the range of motion of pusher 202 to be regulated if necessary.

The suction mouthpiece 198 is reciprocated vertically in time with the pusher 202, being interconnected with the bell crank lever 238. As shown in FIGURES 21 and 22, the mouthpiece is mounted upon the upper end of a vertical plunger 246, which is slidably mounted in a boss 247 forming a part of the vertical bracket 207. The plunger 246 is reciprocated by a lever 248 (FIGURES 19, 21 and 22) which is clamped to a stub shaft 250 journalled for rocking motion in the vertical bracket 207. The lower end of plunger 246 includes a fitting 251 having a pin 252 confined in a slot 253 (FIGURES 21 and 22) formed in the swinging end portion of lever 248. The slot and pin arrangement permits the lever 248 to swing in its arc without binding relative to the plunger 246. The lever 248 is rocked by an actuating lever 254 keyed to the stub shaft 250. An adjustable link 255 is pivotally connected as at 256 to lever 254. The opposite end of link 255 is pivotally connected as at 257 to the lower end portion of the bell crank lever 238.

The arrangement is such that rotation of disk 225 shifts the pusher 202 toward its retracted position (FIGURE 23) while shifting the plunger 246 upwardly to bring the suction mouthpiece into contact with the lower leaflet of the magazine. The plunger 246 includes a bore communicating with the mounting collar 259 of the mouthpiece 198. A flexible conduit (not shown) connects the bore of the plunger with the suction pump, previously noted with reference to the carton magazine. Briefly therefore, suction is applied to the mouthpiece when it assumes the position shown in FIGURE 23 and atmospheric pressure is applied after the lowermost leaflet 200 is engaged and pulled downwardly (FIGURE 24) for engagement by the pusher 202.

The leaflet inserting plungers 204—204 are reciprocated by the cam 224 of cam shaft 18 (FIGURES 7 and 21) in time with the other components of the machine, as noted earlier. The inserting plungers 204—204 are adjustably mounted for reciprocation upon a mounting block 258 secured to the lower end of a vertical rod 260. The rod 260 is adjustably secured in a bracket 261 by means of clamping screws 262. Bracket 261 is carried by a horizontal bar 263 which is adjustably clamped in a block 264 which is mounted upon a vertical reciprocating rod 265. The rod 265 is journalled for sliding motion in a sleeve 266 which is attached to the upper rail 6 of the machine frame.

The lower portion of reciprocating rod 265 includes a bracket 267 pivotally connected as at 268 to a link 270 (FIGURE 22). The lower end of link 270 is pivotally connected as at 271 to a cam lever 272 which is pivotally connected as at 273 to a mounting bracket 274 projecting downwardly from one of the intermediate rails 7 of the machine frame. Cam lever 272 includes a cam roller 275 tracked upon the periphery of the eccentric 224. A tension spring 276 is anchored as at 277 to the outer end of lever 272 and its lower end is anchored as at 278 to the mounting plate 206 so as to pull the cam lever 272 downwardly with its roller 275 in tracking engagement with the eccentric 224.

It will be understood that the lever 272 and associated parts cause vertical reciprocation of the leaflet inserting plungers 204 in time with the other components of the machine. The mounting block 264 permits the position of the plungers 204 to be regulated transversely in the horizontal plane with reference to the carton conveyor in initially setting up the machine. In addition, the bracket 261 permits the position of rod 260 and plungers 204 to be regulated in the vertical direction in accordance with the height of the carton for which the machine is set up.

As best shown in FIGURES 23–29, the leaflet pusher 202 includes at its forward end a relatively thin finger 279 which aids in segregating the lowermost leaflet 200 from the stack 201 during the feed cycle. Thus, as shown in FIGURE 23, the pusher 202 dwells in a stationary retracted position as the suction mouthpiece 198 engages the lowermost leaflet of the stack. As the mouthpiece begins to move downwardly (FIGURE 24), the pusher 202 advances, such that the finger 279 passes between the lowermost leaflet, which is partially withdrawn from the stack. During this portion of the cycle (FIGURE 24), the leaflet inserting plungers 204 will have inserted a leaflet into a previously advanced carton C during its dwell period adjacent the leaflet magazine. After the components reach the position shown in FIGURE 25, the carton conveyor 2 advances the next carton D to its position adjacent the leaflet magazine.

As the next carton D is advanced to its leaflet-receiving position adjacent the magazine (FIGURE 25), the pusher 202 continues its lateral motion with the leaflet confined under the finger 279 and against a shoulder 269 formed at the forward end of the pusher. During this motion, the leaflet 200 is sprung slightly and is confined between finger 279 and the spaced rails 203—203 (FIGURE 28). During this transfer motion, the leaflet inserting plungers 204 are moving downwardly (FIGURE 25) so as to pass between the rails 203 and to engage the leaflet as pusher 202 dwells momentarily in its extended position (FIGURE 26).

During continued downward motion of the inserting plungers 204 (FIGURES 27–29), the leaflet 200 is forced between the rails 203 to a generally U-shaped form, then forced partially into the carton D, which it now interfits. During the downward motion of plungers 204, the lateral pusher 202 shift outwardly toward its retracted position, then the plungers 204 shift upwardly toward their elevated position, ready for the next cycle of operation.

After the leaflet is inserted, the carton advances along the slide plate 50 and around the support plate 52 at the downstream end 53 of the machine (FIGURE 1). During this motion, the article is inserted upon the leaflet, then the carton begins to advance along the upstream run of the machine toward the discharge station, as explained later. During advancement along the upstream run, the side flaps 33—33 and closure flap 35 at the upper end of the carton are closed by the top flap closing mechanism (not shown).

*Carton discharge mechanism*

Upon reaching the upstream end of the machine, the loaded and closed cartons E are discharged laterally by a reciprocating pusher 289 (FIGURES 2 and 10). Pusher 289 is secured to a cross head 280, mounted for reciprocation along a slide bar 281. This arrangement is generally similar to the cross head 128 and slide bar 130 which reciprocates the suction mouthpiece 46 of the carton feed mechanism, as described earlier. It will be noted that the slide bar 281 is mounted parallel to slide bar 130 and supported by the vertical brackets 131 and 132, previously described with reference to FIGURES 8–10. The cross head 280 is reciprocated by a cam 282 keyed to cam shaft 18 (FIGURES 7 and 8). A cam lever 283 is pivotally connected as at 284 to a bracket 285 depending downwardly from the lower rail 8 of the machine frame. Cam lever 283 includes a cam roller (not shown) which is confined in a cam track formed in the face of cam 282.

As shown in FIGURES 8 and 10, the upper end of cam lever 283 includes a link 286 pivotally connected to the lever 283 as at 287. The opposite end of link 286 is pivotally connected as at 288 to the cross head 280. The cross head 280 includes a downwardly depending arm 290 (FIGURE 8) having a roller 291 at its lower end. This roller is confined in a slot (not shown) which is formed in the guide plate 148 previously described. This arrangement confines the cross head 280 against rotary motion so as to sustain the discharge pusher 289 in its horizontal position.

It will be understood at this point, that the pusher 289 is mounted for vertical adjustment with respect to the slide plate 50 (FIGURE 2) at the upstream end of the machine to accommodate the size of the carton. The pusher 289 reciprocates in a plane immediately above the lugs 24 of the conveyor. During the stepwise advancement of the conveyor, pusher 289 resides in the retracted position shown in FIGURE 10, such that the cartons advance to a position in front of the pusher. During the dwell period of the conveyor, the cam 282 shifts the pusher 289 outwardly so as to engage and discharge the loaded carton E laterally from the slide plate 50 at the upstream end of the machine.

*Driving system*

As noted earlier (FIGURE 7) the several components of the machine are actuated in time with one another by the variable speed power unit 10, which is in driving connection with the Geneva gear 17 and cam shaft 18. The power unit 10 comprises a motor 292 pivotally connected as at 293 to the lower rail 8 of the machine frame. Motor 292 includes a variable speed pulley 294 connected by a V-belt 295 to a companion pulley 296, which forms part of a gear box 297. Gear box 297 is attached as at 298 to the lower rail 8. The variable speed drive is regulated by a hand wheel 300 which shifts the motor 292, thereby to change the pitch of the variable speed pulleys 294 and 296.

Gear box 297 includes a vertical shaft 301 in driving connection with the gear box 11 which drives the cam shaft and Geneva gear. An overload clutch 302 is interposed in the vertical shaft 301 to prevent damage to the machine in the case of overloads or jamming of the cartons.

A suction pump and motor unit 303 (FIGURE 7) is mounted upon the lower rail 8 adjacent the power unit 10. This unit includes a conduit 304 for supplying suction to the mouthpieces of the carton magazine and leaflet magazine. The flexible conduits which communicate with the mouthpieces are interconnected with the conduit 304.

Having described my invention, I claim:

1. A cartoning machine comprising, a carton conveyor constituting a self-contained unit adapted to receive and confine individual cartons in an upright position, means for advancing said conveyor in a downstream direction, a carton magazine mounted along the upstream portion of said conveyor, said magazine adapted to confine a stack of cartons in flat collapsed condition, a carton transfer mechanism interposed between said magazine and conveyor adapted to withdraw said collapsed cartons individually from the carton magazine, an adjustable conveyor supporting mechanism connected to the cartoning machine and adapted to support the self-contained carton conveyor in a horizontal plane with reference to the carton magazine and the carton transfer mechanism thereof, manually shiftable means connected to said supporting mechanism adapted to raise or lower the self-contained conveyor relative to the magazine to compensate for the height of the cartons which are confined in the magazine in response to operation of the manually shiftable means, said transfer mechanism adapted to erect each individual carton and to transfer the same to the carton conveyor, said magazine comprising a carton storage portion extending transversely relative to the conveyor, said carton storage portion being inclined downwardly toward the conveyor, said storage portion having a pick-off end adapted to present the cartons to the transfer mechanism in an upright position, whereby the downwardly inclined storage portion of the magazine is adapted to feed the cartons by gravity toward the pick-off end of the magazine to be engaged by the transfer mechanism in an upright position for erection and transfer to the carton conveyor.

2. A cartoning machine as set forth in claim 1 in which there is provided a stationary slide plate extending parallel with the carton conveyor in a plane spaced downwardly therefrom, said slide plate adapted to engage the lower ends of the cartons to support the same in upright position for advancement along a horizontal plane after erection during advancement by the carton conveyor, whereby the supporting mechanism is adapted to raise or lower the self-contained carton conveyor relative to the slide plate to compensate for the length of the cartons which are advanced by the conveyor.

3. A cartoning machine as set forth in claim 2 in which the carton transfer mechanism includes a suction mouthpiece adapted to engage the collapsed carton at the pick-off end of the magazine, means for reciprocating the suction mouthpiece in a horizontal path between the pick-off end of the magazine and the conveyor during a dwell period of the conveyor, and means for positioning the suction mouthpiece at a selected horizontal plane relative to the actuating means, thereby to compensate for the length of the cartons which are confined in upright position in the magazine.

4. A cartoning machine as set forth in claim 3 in which there is provided a plurality of carton erecting fingers mounted in a horizontal plane in a fixed position between the carton magazine and carton conveyor, said carton erecting fingers having curved outer ends disposed in a position to intercept the cartons and to cause erection thereof as the cartons are withdrawn individually from the magazine by the suction mouthpiece.

5. A cartoning machine as set forth in claim 4 in which the plurality of carton erecting fingers include mounting means adapting the fingers to be mounted at selected horizontal planes relative to the magazine in accordance with the selected horizontal plane of reciprocation of the suction mouthpiece, thereby to locate the erecting fingers in horizontal planes related to the horizontal path of motion of the suction mouthpiece.

6. A cartoning machine as set forth in claim 20 in which the machine is adapted to handle cartons which include upper side flaps and in which the cartoning machine is provided with a top flap folder element adapted to reciprocate in a horizontal path parallel with and spaced outwardly from the carton conveyor, said top flap folder element adapted to advance in the downstream direction and across the top flaps of the carton confined in the pocket of the conveyor during a stationary dwell period thereof, thereby to fold said top flaps to a horizontal position, a stationary slide plate mounted parallel with and spaced downwardly from the top flap folder, said slide plate being located downstream from the top flap folder element and adapted to slidably engage the bottom of the carton, and a stationary hold-down bar mounted in a horizontal plane parallel with and spaced above the stationary slide plate, said hold-down bar adapted to slidably engage said upper side flaps after the top flap folder has folded said flaps to a horizontal position, whereby the carton is confined between said stationary slide plate and hold-down bar during stepwise advancement thereof by the conveyor.

7. A cartoning machine as set forth in claim 6 in which there is provided flap erecting means at the downstream end of the hold-down bar, said flap erecting means adapted to engage and shift said top flaps to an erected position upon advancement beyond the downstream end of the hold-down bar, adapting articles to be fed into the open upper end of the carton after passage beyond said flap erecting means with said bottom flaps confined in closed position by said stationary slide plate.

8. A cartoning machine as set forth in claim 6 in which the machine is adapted to handle cartons which include upper and lower side flaps at opposite ends, and in which the cartoning machine is provided with a bottom flap folder element mounted in a plane spaced below said top flap folder element and adapted to advance in unison with the top flap folder element in the downstream direction and across the lower side flaps of the carton, said bottom flap folder element adapted to fold said bottom flaps to a horizontal position during reciprocation of the flap folder in the downstream direction, and means slidably engageable with the top and bottom flap after the side flaps have been folded to said horizontal position to confine the carton endwisely during stepwise advancement thereof by the conveyor.

9. A cartoning machine as set forth in claim 1 in which the downwardly inclined storage portion of the carton magazine includes a curved portion at the lower end thereof which bends with the downwardly inclined storage portion, said curved portion having a pick-off end adapted to present the cartons to the transfer mechanism in an upright position.

10. A cartoning machine as set forth in claim 1 in which the carton transfer mechanism includes a suction mouthpiece adapted to engage the collapsed carton at the pick-off end of the magazine, and in which the conveyor includes pairs of spaced lugs, each pair of lugs having adjacent shoulders spaced outwardly from the carton conveyor, each pair of lugs and the shoulders thereof delineating a pocket adapted to receive and confine a carton in upright position, means for reciprocating the suction mouthpiece in a horizontal path between the pick-off end of the magazine and a pocket of the conveyor, said suction mouthpiece adapted to release the erected carton upon transfer thereof into the pocket and into engagement with said shoulders.

11. A cartoning machine as set forth in claim 10 in which the suction mouthpiece is mounted upon a reciprocating arm and in which the spacing between the carton conveyor and the shoulders of the lugs is greater than the combined dimension of the reciprocating arm and the mouthpiece thereof, whereby said arm and mouthpiece are adapted to dwell between the carton conveyor and shoulders after the carton has been shifted into engagement with the shoulders and released by said mouthpiece, thereby adapting the conveyor to advance the carton in a downstream direction during the dwell period of the arm and mouthpiece.

12. A cartoning machine comprising, a carton conveyor, said carton conveyor comprising upper and lower pairs of sprockets, upper and lower sprocket chains trained about said upper and lower sprockets and disposed in horizontal plane spaced one above the other, a series of spaced conveyor lugs mounted in alternate relationship upon said upper and lower sprocket chains, said upper and lower pairs of sprockets being adapted to be rotated relative to one another to vary the space between the lugs mounted upon said upper and lower sprocket chains, whereby said adjacent lugs of said upper and lower sprocket chains delineate respective pockets adapted to receive and confine individual cartons of selected size in upright position, means for advancing said upper and lower pairs of sprockets in unison, in a downstream direction, said means advancing the sprockets in stepwise fashion to provide a stationary dwell period, a carton magazine mounted along said carton conveyor, said magazine adapted to confine a stack of cartons in flat collapsed condition, said carton magazine having shiftable carton guide elements adapted to loosely engage the opposite side edges of said stack of cartons, said guide elements adapted to be positioned apart from one another at a spacing related to the setting of the lugs of the upper and lower sprocket chains, thereby to confine collapsed cartons which, when erected, interfit the pockets of the conveyor, and a carton transfer mechanism interposed between said magazine and conveyor adapted to withdraw said collapsed cartons individually from the carton magazine, said transfer mechanism adapted to erect each individual carton and to transfer the same into an individual pocket of the carton conveyor during a dwell period thereof.

13. A cartoning machine comprising, a carton conveyor disposed in a horizontal plane and having a series of pockets adapted to receive and confine individual cartons in an upright position, means for advancing said conveyor in stepwise fashion in a downstream direction and providing stationary dwell periods, a carton magazine mounted along said conveyor, said magazine adapted to confine a stack of cartons in flat collapsed condition, said carton magazine having shiftable guide elements and being adapted to confine collapsed cartons having selected dimensions, a transfer mechanism adapted to withdraw said collapsed cartons individually from the carton magazine, said magazine adapted to present the collapsed cartons in upright position to the transfer mechanism, said transfer mechanism adapted to erect each individual carton and to transfer the same into an individual pocket of the carton conveyor during a dwell period thereof, a slide plate mounted in a horizontal plane beneath said carton conveyor and adapted to support the lower end of the cartons which are confined in the pockets of the carton conveyor, a leaflet magazine mounted along said conveyor downstream from said carton magazine, said carton conveyor adapted to locate an erected carton on said slide plate in an upright position laterally displaced from the leaflet magazine during a dwell period of the conveyor, a leaflet transfer mechanism interposed between said leaflet magazine and carton conveyor, said leaflet magazine adapted to confine a stack of leaflets in generally vertical formation, said leaflet transfer mechanism adapted to withdraw the leaflet individually from the lower end of said magazine and to shift the leaflet laterally to a position above the carton resting upon said slide plate during a dwell period of the carton conveyor, said transfer mechanism thereafter adapted to insert said leaflet into the upper portion of the carton during said dwell period of the carton conveyor.

14. A cartoning machine as set forth in claim 13 in which the leaflet magazine includes shiftable leaflet guide elements adapted to loosely engage the opposite end portions of said stack of leaflets, said leaflet guide elements adapted to be positioned apart from one another at a spacing related to the spacing of the shiftable carton guide elements, whereby the leaflet magazine is adapted to confine leaflets having dimensions related to the size of the cartons which are confined in said carton magazine.

15. A cartoning machine as set forth in claim 14 in which the leaflet magazine is shiftable vertically relative to the slide plate to a selected elevation, thereby to locate the magazine vertically at an elevation which is related to the height of the upright carton resting upon the slide plate.

16. A cartoning machine as set forth in claim 15 in which the leaflet magazine and leaflet transfer mechanism comprise a self-contained unit, and mounting means for said self-contained unit, said mounting means adapted to locate the self-contained unit at a selected elevation relative to the slide plate, thereby to locate the unit at an elevation which is related to the height of the upright carton resting upon the slide plate.

17. A cartoning machine as set forth in claim 16 in which the cartoning machine includes means demountably securing the said self-contained unit in operating position with reference to said carton conveyor and slide plate, and drive means in said cartoning machine adapted to operate the leaflet transfer mechanism in time with the carton transfer mechanism and carton conveyor, said drive means adapting the self-contained unit to be disconnected from said drive means, adapting the self-contained unit to be demounted from the cartoning machine without disturbing the timing thereof.

18. A cartoning machine as set forth in claim 17 in which the leaflet transfer mechanism includes a pair of rails extending in a horizontal plane from the lower end of the leaflet magazine to a point above the carton conveyor, said rails being spaced apart from one another, a suction mouthpiece mounted for reciprocation in a vertical path between said rails and beneath the lower end of the magazine, said suction mouthpiece adapted to engage the lowermost leaflet in said magazine and to draw the mid-portion of the leaflet downwardly to a bowed position between the rails and spaced below the lower end of the stack of leaflets confined in the magazine, a leaflet pusher mounted for reciprocation in a horizontal path parallel with and between said rails, said pusher adapted to engage and confine said leaflet in bowed position and to shift said bowed leaflet laterally to a position above the upper end of a carton during a dwell period thereof, and vertically shiftable leaflet inserting means adapted to pass downwardly between said rails and into the upper end portion of the carton during said dwell period, whereby the leaflet which is positioned above the carton is forced downwardly between the rails to a U-shaped formation and forced into the upper portion of the carton.

19. A cartoning machine as set forth in claim 18 in which the leaflet pusher includes a finger projecting outwardly and having a shoulder delineating the juncture of the finger and pusher, said finger adapted to be inserted between the leaflet which is bowed downwardly from the lower leaflet in the magazine, thereby to segregate the bowed leaflet during reciprocation of the pusher from the retracted position, said shoulder adapted to engage and shift the segregated leaflet laterally to a position above the upper end of the carton during the dwell period of the carton conveyor.

20. A cartoning machine comprising, a carton conveyor constituting a self-contained unit adapted to receive and confine individual cartons in an upright position, means for advancing said conveyor in stepwise fashion in a downstream direction and providing stationary dwell periods, a carton magazine mounted along the upstream portion of said conveyor said magazine adapted to confine a stack of cartons in flat collapsed condition, a carton transfer mechanism interposed between said magazine and conveyor adapted to withdraw said collapsed cartons individually from the carton magazine, an adjustable conveyor supporting mechanism connected to the cartoning machine and adapted to support the self-contained carton conveyor in a horizontal plane with reference to the carton magazine and the carton transfer mechanism thereof, manually shiftable means connected to said supporting mechanism adapted to raise or lower the self-contained conveyor relative to the mazazine to compensate for the height of the cartons which are confined in the magazine in response to operation of the manually shiftable means, said transfer mechanism adapted to erect each individual carton and to transfer the same to the carton conveyor, said magazine comprising a carton storage portion extending transversely relative to the conveyor, said carton storage portion being inclined downwardly toward the conveyor, said storage portion having a pick-off end adapted to present the cartons to the transfer mechanism in an upright position, whereby the downwardly inclined storage portion of the magazine is adapted to feed the cartons by gravity toward the pick-off end of the magazine to be engaged by the transfer mechanism in an upright position for erection and transfer to the carton conveyor.

21. A cartoning machine comprising, a carton conveyor constituting a self-contained unit adapted to receive and confine individual cartons in an upright position, means for advancing said conveyor in a downstream direction, a carton mazagine mounted along the upstream portion of said conveyor said magazine adapted to confine a stack of cartons in flat collapsed condition, a carton transfer mechanism interposed between said magazine and conveyor adapted to withdraw said collapsed cartons individually from the carton magazine, an adjustable conveyor supporting mechanism connected to the cartoning machine and adapted to support the self-contained carton conveyor in a horizontal plane with reference to the carton magazine and the carton transfer mechanism thereof, manually shiftable means connected to said supporting mechanism adapted to raise or lower the self-contained conveyor relative to said magazine to compensate for the height of the cartons which are confined in the magazine in response to operation of the manually shiftable means, said transfer mechanism adapted to erect each individual carton and to transfer the same to the carton conveyor, said magazine comprising a carton storage portion extending transversely relative to the conveyor, said carton storage portion having a pick-off end adapted to present the cartons to the transfer mechanism in an upright position, whereby the portion of the magazine is adapted to feed the cartons toward the pick-off end of the magazine to be engaged by the transfer mechanism in an upright position for erection and transfer to the carton conveyor.

References Cited by the Examiner
UNITED STATES PATENTS

| | | | |
|---|---|---|---|
| 2,263,501 | 11/1941 | Jones | 53—186 X |
| 2,318,208 | 5/1943 | First et al. | 53—186 X |
| 2,728,177 | 12/1955 | Holstebroe et al. | 53—186 X |
| 2,836,946 | 6/1958 | Schroeder | 53—374 X |
| 3,060,654 | 10/1962 | Lubersky et al. | 53—29 |

TRAVIS S. McGEHEE, *Primary Examiner.*